US010574117B2

(12) United States Patent
Okazaki et al.

(10) Patent No.: US 10,574,117 B2
(45) Date of Patent: Feb. 25, 2020

(54) STATOR OF ELECTRIC MOTOR AND COOLING STRUCTURE OF ELECTRIC ROTATING MACHINE

(71) Applicant: KUBOTA CORPORATION, Osaka-shi, Osaka (JP)

(72) Inventors: Kazuto Okazaki, Sakai (JP); Sumio Yagyu, Sakai (JP)

(73) Assignee: KUBOTA CORPORATION, Osaka-shi, Osaka (JP)

( * ) Notice: Subject to any disclaimer, the term of this patent is extended or adjusted under 35 U.S.C. 154(b) by 390 days.

(21) Appl. No.: 15/321,001

(22) PCT Filed: Jun. 18, 2015

(86) PCT No.: PCT/JP2015/067612
§ 371 (c)(1),
(2) Date: Dec. 21, 2016

(87) PCT Pub. No.: WO2015/198961
PCT Pub. Date: Dec. 30, 2015

(65) Prior Publication Data
US 2017/0141653 A1 May 18, 2017

(30) Foreign Application Priority Data

| Jun. 24, 2014 | (JP) | 2014-129325 |
| Jan. 30, 2015 | (JP) | 2015-017021 |
| Jan. 30, 2015 | (JP) | 2015-017022 |

(51) Int. Cl.
*H02K 9/19* (2006.01)
*H02K 1/14* (2006.01)
(Continued)

(52) U.S. Cl.
CPC ............. *H02K 9/19* (2013.01); *H02K 1/146* (2013.01); *H02K 3/18* (2013.01); *H02K 3/34* (2013.01); *H02K 5/20* (2013.01)

(58) Field of Classification Search
CPC .......... H02K 1/14; H02K 1/146; H02K 21/16; H02K 2203/12; H02K 3/18; H02K 3/34;
(Continued)

(56) References Cited

U.S. PATENT DOCUMENTS 5,448,118 A 9/1995 Nakamura et al.
2002/0074868 A1 6/2002 Ishida
(Continued)

FOREIGN PATENT DOCUMENTS

CN 101119055 A 2/2008
DE 10122425 A1 11/2002
(Continued)

OTHER PUBLICATIONS

Partial Supplementary European Search Report for European Application No. 15811168.2, dated May 16, 2018.

*Primary Examiner* — Gustavo A Rosario-Benitez
*Assistant Examiner* — Bart Iliya
(74) *Attorney, Agent, or Firm* — Birch, Stewart, Kolasch & Birch, LLP

(57) ABSTRACT

To increase a thermal transmission amount between a tooth and an insulation member and reduce a thermal resistance. A stator (1) of an electric motor includes a yoke (2), a plurality of teeth (3) arranged in a circumferential direction of an inner circumference of the yoke (2), a winding wire (5) wound on the tooth (3), and an insulation member (4) disposed between the tooth (3) and the winding wire (5), the insulation member (4) being formed of elastic resin. A concave-convex portion (3a) is formed at least on a circumferential surface (A) among the circumferential surface and
(Continued)

an axial surface (B) of the tooth (3). A concave-convex portion (4a) is formed on an inner surface of the insulation member (4), the concave-convex portion (4a) being configured to be fitted to the concave-convex portion (3a).

13 Claims, 16 Drawing Sheets

(51) Int. Cl.
  *H02K 3/18* (2006.01)
  *H02K 3/34* (2006.01)
  *H02K 5/20* (2006.01)
(58) Field of Classification Search
  CPC ............ H02K 3/345; H02K 5/20; H02K 9/19; H02K 3/32
  See application file for complete search history.

(56) References Cited

U.S. PATENT DOCUMENTS

| | | | |
|---|---|---|---|
| 2005/0057106 A1* | 3/2005 | Allen | H02K 9/22 310/54 |
| 2010/0007227 A1 | 1/2010 | Smith et al. | |
| 2011/0304226 A1 | 12/2011 | Bradfield | |
| 2013/0300223 A1 | 11/2013 | Kondo et al. | |
| 2013/0300248 A1* | 11/2013 | Ishida | H02K 3/345 310/214 |
| 2014/0167536 A1 | 6/2014 | Hyun | |
| 2014/0197701 A1* | 7/2014 | Hossain | H02K 9/22 310/52 |
| 2015/0130302 A1* | 5/2015 | Leberle | H02K 5/20 310/54 |

FOREIGN PATENT DOCUMENTS

| | | |
|---|---|---|
| DE | 102011007344 A1 | 10/2012 |
| JP | 49-95908 A | 9/1974 |
| JP | 53-51407 A | 5/1978 |
| JP | 1-101152 U | 7/1989 |
| JP | 5-103445 A | 4/1993 |
| JP | 8-47196 A | 2/1996 |
| JP | 8-223843 A | 8/1996 |
| JP | 8-223866 A | 8/1996 |
| JP | 8-251872 A | 9/1996 |
| JP | 9-191588 A | 7/1997 |
| JP | 9-219954 A | 8/1997 |
| JP | 10-290543 A | 10/1998 |
| JP | 2000-341894 A | 12/2000 |
| JP | 2002-262514 A | 9/2002 |
| JP | 2004-112961 A | 4/2004 |
| JP | 2004-229418 A | 8/2004 |
| JP | 2004-357458 A | 12/2004 |
| JP | 2006-6050 A | 1/2006 |
| JP | 2006-14564 A | 1/2006 |
| JP | 2006-115565 A | 4/2006 |
| JP | 2006-141173 A | 6/2006 |
| JP | 2007-143247 A | 6/2007 |
| JP | 2007-267492 A | 10/2007 |
| JP | 2010-200469 A | 9/2010 |
| JP | 2010200469 A * | 9/2010 |
| JP | 2011-72183 A | 4/2011 |
| JP | 2012-95484 A | 5/2012 |
| JP | 2013-179745 A | 9/2013 |
| JP | 2013-179746 A | 9/2013 |
| JP | 2014-90568 A | 5/2014 |
| JP | 2014-96876 A | 5/2014 |
| WO | WO 2010/086997 A1 | 8/2010 |
| WO | WO 2011/146005 A1 | 11/2011 |
| WO | WO 2012/101976 A1 | 8/2012 |

* cited by examiner

STATOR OF ELECTRIC MOTOR AND COOLING STRUCTURE OF ELECTRIC ROTATING MACHINE

DETAILED DESCRIPTION OF THE INVENTION

Technical Field

The present invention relates to a stator of an electric motor applied to an industrial apparatus as a single driving source or a hybrid driving source being combined with an engine and to a cooling structure of an electric rotating machine applied to an automobile and the industrial apparatus.

Background Art

An electric motor (including various types of IPM motor generator) applied to an automobile and an industrial apparatus such as an agricultural machine, a construction machine, a utility vehicle is mounted, on the apparatus, as a series hybrid driving source or a parallel hybrid driving source. For example, a synchronous electric motor using embedded permanent magnets is employed as the electric motor mentioned above.

The stator of the electric motor employs either one of a stator-chips circular coupling type and a yoke integration type being formed by projecting a plurality of teeth on an inner circumference of a circular yoke, the stator-chips circular coupling type being formed by circularly arranging a plurality of split stators, each of the split stators being formed by projecting a tooth on a split yoke.

Patent document 1 discloses the stator of the stator-chips circular coupling type. The stator disclosed in Patent document 1 is a stator circularly coupling stator chips, each of the stator chips being formed of pole tooth coiled by a winding wire, the pole tooth being a split stator core applied to an insulation process. The stator includes a slot insulation plate and an insulation member having elasticity, the slot insulation plate being configured to insulate a slot opening portion of the split stator core. The insulation member is disposed between the slot insulation plate and the winding wire (claim 1). In this manner, that configuration suppresses an aging deterioration of an insulation performance of the stator winding wire and thereby improves the high efficiency and the high reliability.

In particular, in a flat and thin motor of the electric motors, a width of a water race tends to be wider than a lamination thickness of the stator in order to provide a required length of a cooling water race, and an area contacting to a heat source (the winding wire and the stator) is limited and thus is hard to provide the efficient cooling. For example, time during the continuous driving of the motor at a high power is limited because the cooling cannot be provided sufficiently, and thus inconvenience will occur in the usage of the motor.

An electric motor disclosed in Patent document 2 includes a stator and a rotor, the stator including a stator main body disposed inside a motor housing and a stator coil disposed being wound on the stator main body, the rotor being inserted in the stator and being capable of revolving. A resin is provided in a gap space between an end surface of the stator and an inner wall surface of the motor housing. The resin is also provided into a gap space between coil windings of coil ends, the coil ends being disposed on a surface of a coil end portion protruding from the stator main body. In addition, a motor housing is formed to have a doubled structure with an outer cylindrical portion and an inner cylindrical portion and thus serves as a water jacket, and in that configuration a cooling medium passing through the gap space (a jacket passage) in the water jacket absorbs heats of the stator coil and the stator.

In addition, the stator of the electric motor winds the coil on teeth in the concentrated winding or in the distributed winding, the teeth projecting from a yoke. The direct cooling using an automatic transmission fluid (ATF), the liquid cooling using a water jacket as an outer case, and the like are provided in order to radiate the heat generated by a copper loss of the coil and the heat generated by an iron loss of the stator.

In the ATF cooling, a contacting area between the coil and the cooling medium is small. Thus, a heat transmission amount is small, and it is difficult to cool a portion in the vicinity of the coil. In addition, in the water jacket cooling with the outer case, an air space is formed between the stator and the outer case, thereby providing a large thermal resistance. In addition, a distance to the coil is long, and thus a heat radiation efficiency is low.

Patent document 3 discloses a technique to mold an electromagnetic coil wound on an iron core in the mold forming using a mold resin and thus to use a high thermal conductivity of the mold resin.

In addition, Patent document 4 discloses a technique to arrange a cooling medium supply port separating from a coil in a direction of an axis of a stator, to supply the cooling medium from the cooling medium supply port to the end surfaces of the coil and thereby to contact the end surfaces of the coil to each other, one of the end surfaces being in the axial direction, the other one of the end surfaces being in a circumferential direction, and thus to improve the cooling efficiency.

RELATED ART DOCUMENTS

Patent Documents

[Patent document 1] Japanese Unexamined Patent Application Publication No. 2006-141173.
[Patent document 2] Japanese Unexamined Patent Application Publication No. H10-290543.
[Patent document 3] PCT International Publication No. WO2012/101976A1.
[Patent document 4] Japanese Unexamined Patent Application Publication No. 2014-096876.

DISCLOSURE OF THE INVENTION

Problems to be Solved by the Invention

The technique disclosed in Patent document 1 can be expected to reduce the aging deterioration due to the insulation member. However, a contacting area between the insulation member and the tooth (the split stator core) is reduced, and a contacting area between the insulation member and the winding wire is reduced. In this manner, that causes problems that a thermal conduction amount between the insulation member and the winding wire is small, that an air space is generated between the insulation member and the winding wire, the air space increasing the thermal resistance, and the like.

In addition, the technique disclosed in Patent document 2 is capable of using a thermal conduction path from the stator coil and a surface of the stator to the water jacket through resin in addition to the thermal conduction path from an outer circumference of the stator to the water jacket. In this manner, the cooling efficiency can be improved. However, the jacket channel serving as a coolant supply channel is formed in the motor housing, and thus the motor housing itself is hard to be a member having a high strength. In addition, the stator is fitted to the motor housing having the jacket channel in the shrink fitting, and thus the thermal resistance may be increased to deteriorate a cooling performance.

In addition, the technique disclosed in Patent document 3 can efficiently carry out the thermal conduction form the electromagnetic coil to the mold resin. However, the external case also has to be formed of the mold resin, and thus when the electromagnetic coil is arranged in the external case formed of metal, the heat radiation from the mold resin to the outside is difficult.

In addition, the technique disclosed in Patent document 4 can directly cool the circumference surface of the coil. However, the coolant contacts to the coil in a short time, and thus it is difficult to improve the cooling efficiency.

The present invention intends to provide a stator for an electric motor and a cooling structure for an electric rotating machine capable of solving the problems mentioned in the above conventional techniques.

The present invention forms a concave-convex on a surface of a tooth and on an inner surface of an insulation member surrounding the tooth and fits the concave-convex on the surface of the tooth to the concave-convex on the inner surface of the insulation member, and thus intends to provide a stator of an electric motor capable of increasing a thermal conduction amount between the tooth and the insulation member and reducing a thermal resistance.

In addition, the present invention provides a thermal conductor on an inner circumference surface of the water jacket, the thermal conductor covering a winding wire and a stator and thereby being integrated with the winding wire and the stator and attaches the water jacket in a motor jacket formed separately, and thus intends to provide a cooling structure for an electric motor capable of increasing a strength of the water jacket and improving a cooling efficiency.

In addition, the present invention forms a coolant channel inside a thermal conductor covering a winding wire of a tooth, the thermal conductor formed of resin having a high thermal conductivity, and thus intends to provide a cooling structure for an electric rotating machine capable of cooling the winding wire with high efficiency.

Means of Solving the Problems

To solve the above-mentioned technical problems, concrete techniques that the present invention provides are characterized as follows.

In a first aspect of the present invention, a stator of an electric motor includes a yoke 2, a plurality of teeth 3 arranged in a circumferential direction of an inner circumference of the yoke 2, a winding wire 5 wound on the tooth 3, an insulation member 4 disposed between the tooth 3 and the winding wire 5, the insulation member 4 being formed of elastic resin, a concave-convex portion 3a formed at least on a circumferential surface A among the circumferential surface A and an axial surface B of the tooth 3, and a concave-convex portion 4a formed on an inner surface of the insulation member 4, the concave-convex portion 4a being configured to be fitted to the concave-convex portion 3a.

In a second aspect of the present invention, the insulation member 4 includes an outer surface 4b surrounding the tooth 3 and being positioned outside the circumferential surface A and the axial surface B of the tooth 3, the outer surface 4b being formed to have a circular arc shape intermediately bulging in a winding direction of the winding wire 5.

In a third aspect of the present invention, the winding wire 5 has a circular cross section, and the outer surface 4b includes a plurality of attachment portions 4c arranged in a direction of a diameter of the tooth 3, the attachment portion 4c being fitted to the winding wire 5.

In a fourth aspect of the present invention, the insulation member 4 is split to have a split shape, one of the insulation members 4 of the split shape is opposed to the other one of the insulation members 4, and both of the insulation members 4 opposed to each other surround the circumferential surface A and the axial surface B of the tooth 3.

In a fifth aspect of the present invention, a cooling structure of an electric rotating machine includes a water jacket 12 internally including a jacket channel 12a configured to allow passage of a coolant, the water jacket 12 being formed of material having a high thermal conductivity and disposed in the motor housing 16, a stator 14 disposed on an inner circumference of the water jacket 12, the stator 14 having a circular shape, a winding wire 13 wound on the stator 14, a thermal conductor 15 integrated with an inner circumferential surface 12b of the water jacket 12, the thermal conductor 15 being formed of resin having a high thermal conductivity and molded to cover the winding wire 13 and the stator 14 in mold forming, and a motor housing 16 separated from the water jacket 12.

In a sixth aspect of the present invention, the water jacket 12 is formed of aluminum alloy, the motor housing 16 is formed of a casting using iron, and the thermal conductor 15 is molded on the inner circumferential surface 12b of the water jacket 12 in mold forming before the water jacket 12 is disposed in the motor housing 16 and covers the winding wire 13 and the stator 14.

In a seventh aspect of the present invention, the water jacket 12 has a cylindrical shape, and the jacket channel 12a is formed to have a zigzag shape extending in a circumferential direction of the water jacket 12 within a width of water jacket 12, the width extending between both ends of the water jacket 12 in an axial direction of the water jacket 12.

In an eighth aspect of the present invention, the thermal conductor 15 is formed to have a width on an inner side of a diameter of the stator 14 and another width on an outer side of the diameter of the stator 14, the another width being wider than the width, the width and the another width extending in an axial direction of the stator 14, and the thermal conductor 15 includes a portion on the outer side of the diameter of the stator 14, the portion having a width substantially corresponding to a full width of the water jacket 12 in the axial direction of the water jacket 12.

In a ninth aspect of the present invention, the cooling structure for the electric rotating machine includes a coolant channel 18 disposed in the thermal conductor 15, the coolant channel 18 being overlapped with the stator 14 and the winding wire 13.

In a tenth aspect of the present invention, a cooling structure for an electric rotating machine includes a yoke 32 having a circular shape, a tooth 33 projecting from the yoke 32, a winding wire 35 wound on the tooth 33, a stator 31 including the yoke 32, the tooth 33, and the winding wire 35, a thermal conductor 37 formed of resin having a high thermal conductivity, the thermal conductor 37 being molded on both side surfaces of the stator 31 in an axial direction of the stator 31 and filled in a space between the winding wires 35, and a coolant channel 38 disposed in the thermal conductor 37.

In an eleventh aspect of the present invention, the cooling structure for the electric rotating machine includes an insulation member 34 disposed between the tooth 33 and the winding wire 35, the insulation member 34 being formed of elastic resin. The winding wire 35 is wound on the insulation member 34 disposed on the tooth 33 in concentrated winding, and the cooling channel 38 is arranged being overlapped with the winding wire 35.

In a twelfth aspect of the present invention, the cooling channel 38 is formed on at least one of side surfaces included in the stator 31 in an axial direction of the stator 31 and has a circular shape, a spiral shape, a lattice shape, or a zigzag shape extending in a circumferential direction of the thermal conductor 37 in a view seen in an axial direction of the stator 31.

Effects of the Invention

According to the stator for the electric motor of the present invention, the thermal conduction amount between the tooth and the insulation member is increased, and the thermal resistance between the tooth and the insulation member is reduced.

That is, the concave-convex portion 3a is formed at least on the circumferential surface A among the circumferential surface A and an axial surface B of the tooth 3, and the concave-convex portion 4a is formed on the inner surface of the insulation member 4, the concave-convex portion 4a being configured to be fitted to the concave-convex portion 3a. In this manner, the inner surface of the insulation member 4 is tightly attached to the circumferential surface A of the tooth 3 with a large area, thus the air space is reduced, and thereby the thermal conduction amount between the inner surface and the circumferential surface A is increased and the thermal resistance between the inner surface and the circumferential surface A is reduced.

In addition, the outer surface 4b of the insulation member 4 is formed to have a circular arc shape intermediately bulging in a winding direction of the winding wire 5. In this manner, the air space between the winding wire 5 and the outer surface 4b of the insulation member 4 is reduced, and thereby the thermal conduction amount between the winding wire 5 and the outer surface 4b is increased and the thermal resistance between the winding wire 5 and the outer surface 4b is reduced.

In addition, the winding wire 5 has a circular shape in a cross section, the outer surface 4b includes the spiral concave-convex portion (a spiral attachment portion including a concave portion and a convex portion) 4c fitted to the winding wire 5, and a plurality of the attachment portions 4c are formed and arranged in a direction of diameter of the tooth 3. Thus, the outer surface 4b of the insulation member 4 is tightly attached to the winding wire 5 with a large area. In this manner, the air space between the winding wire 5 and the outer surface 4b of the insulation member 4 is reduced, and thereby the thermal conduction amount between the winding wire 5 and the outer surface 4b is increased and the thermal resistance between the winding wire 5 and the outer surface 4b is reduced.

In addition, the insulation member 4 is split to have a split shape, one of the insulation members 4 of the split shape is opposed to the other one of the insulation members 4, and both of the insulation members 4 opposed to each other surround the circumferential surface A and the axial surface B of the tooth 3. In this manner, the insulation members 4 are manufactured and attached extremely easily.

In addition, according to the cooling structure for the electric rotating machine, a strength of the water jacket of the electric rotating machine is increased, and a cooling efficiency is improved.

That is, the cooling structure of an electric rotating machine includes a water jacket 12 internally including a jacket channel 12a configured to allow passage of a coolant, a stator 14 disposed on an inner circumference of the water jacket 12, the stator 14 having a circular shape, a winding wire 13 wound on the stator 14, a thermal conductor 15 integrated with an inner circumferential surface 12b of the water jacket 12, and a motor housing 16 separated from the water jacket 12. The thermal conductor 15 is formed of resin having a high thermal conductivity and molded to cover the winding wire 13 and the stator 14 in mold forming. The water jacket 12 is formed of material having a high thermal conductivity and disposed in the motor housing 16. In this manner, a reinforcement strength of the water jacket 12 is also increased with improvement of the cooling efficiency.

In addition, the water jacket 12 is formed of aluminum alloy, the motor housing 16 is formed of a casting using iron, and the thermal conductor 15 is molded on the inner circumferential surface 12b of the water jacket 12 in the mold forming before the water jacket 12 is disposed in the motor housing 16 and covers the winding wire 13 and the stator 14. That is, the water jacket 12 is attached to the motor housing 16 formed of a casting using iron having a high strength with the water jacket 12 formed of the aluminum alloy having a high thermal conductivity. In this manner, a reinforcement strength of the water jacket 12 is increased more certainly with improvement of the cooling efficiency.

In addition, the water jacket 12 has a cylindrical shape, and the jacket channel 12a is formed to have a zigzag shape extending in a circumferential direction of the water jacket 12 within a width of water jacket 12, the width extending between both ends of the water jacket 12 in an axial direction of the water jacket 12. In this manner, the supplied coolant is capable of cooling the water jacket 12 efficiently.

In addition, the thermal conductor 15 is formed to have a width on an inner side of a diameter of the stator 14 and another width on an outer side of the diameter of the stator 14, the another width being wider than the width, the width and the another width extending in an axial direction of the stator 14, and the thermal conductor 15 includes a portion on the outer side of the diameter of the stator 14, the portion having a width substantially corresponding to a full width of the water jacket 12 in the axial direction of the water jacket 12. In this manner, the thermal conduction from the thermal conductor 15 to the water jacket 12 is carried out efficiently and effectively by the small number of components.

In addition, the coolant channel 18 is formed inside the thermal conductor 15, and the coolant channel 18 is overlapped with the stator 14 and the winding wire 13. In this manner, the thermal conductor 15 itself is cooled efficiently in the vicinity of the stator 14 and the winding wire 13.

In addition, according to the cooling structure of the electric rotating machine of the present invention, the winding wire is cooled efficiently.

That is, the cooling structure for the electric rotating machine includes a yoke 32 having a circular shape, a tooth 33 projecting from the yoke 32, a winding wire 35 wound on the tooth 33, a stator 31 including the yoke 32, the tooth 33, and the winding wire 35, and a thermal conductor 37 formed of resin having a high thermal conductivity. The thermal conductor 37 is molded on both side surfaces of the stator 31 in an axial direction of the stator 31 and filled in a space between the winding wires 35, and a coolant channel 38 is disposed in the thermal conductor 37. In this manner, the heat is removed by the thermal conductor 37 from the winding wire 35 with a low resistance, the thermal conductor 37 having a large displacement, and the removed heat is cooled efficiently in the thermal conductor 37 by the coolant flowing in the coolant channel 38.

The cooling structure for the electric rotating machine includes an insulation member 34 disposed between the tooth 33 and the winding wire 35, the insulation member 34 being formed of elastic resin. The winding wire 35 is wound on the insulation member 34 disposed on the tooth 33 in the concentrated winding, and the cooling channel 38 is arranged being overlapped with the winding wire 35. In this manner, the thermal conductor 37 is molded in the mold forming with the high thermal conductivity resin filled into a space between the winding wires 35, the heat conducts from the entire circumference of the winding wire 35 to the thermal conductor 37, and the conducting heat is cooled efficiently by the coolant flowing in the coolant channel 38 arranged overlapping with the winding wire 35.

In addition, the cooling channel 38 is formed on at least one of side surfaces included in the stator 31 in an axial direction of the stator 31 and has a circular shape, a spiral shape, a lattice shape, or a zigzag shape extending in a circumferential direction in a view seen in an axial direction. In this manner, the side surface of the stator 31 in the axial direction includes a large area, a portion of the large area cools the thermal conductor 37, and thus the cooling efficiency is improved.

MODE FOR CARRYING OUT THE INVENTION

Figure 1:
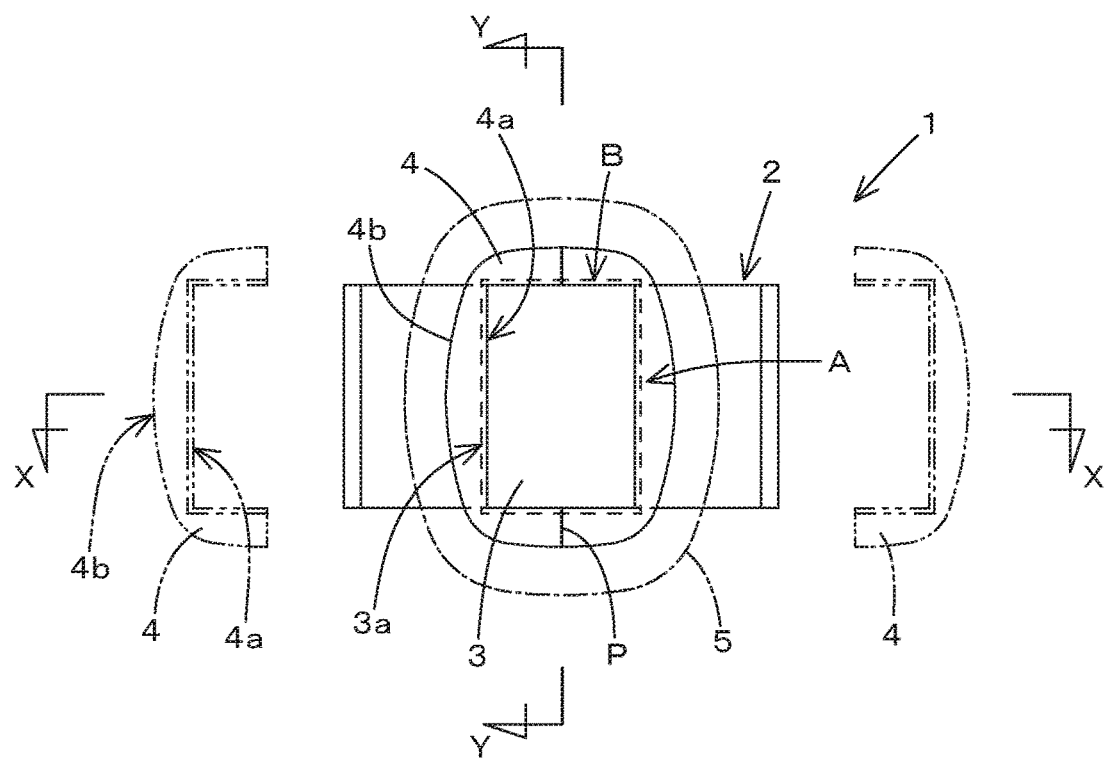
FIG. 1 is a front view illustrating a stator for an electric motor according to a first embodiment of the present invention.
Figure 2:
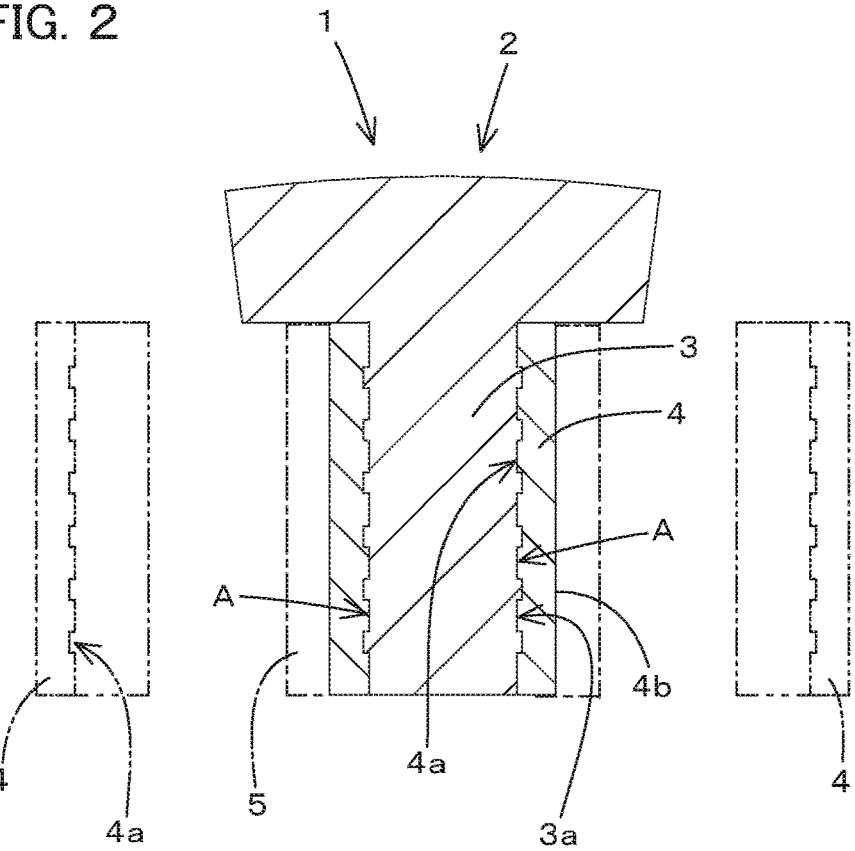
FIG. 2 is a cross section view in an X-X line of FIG. 1.
Figure 3:
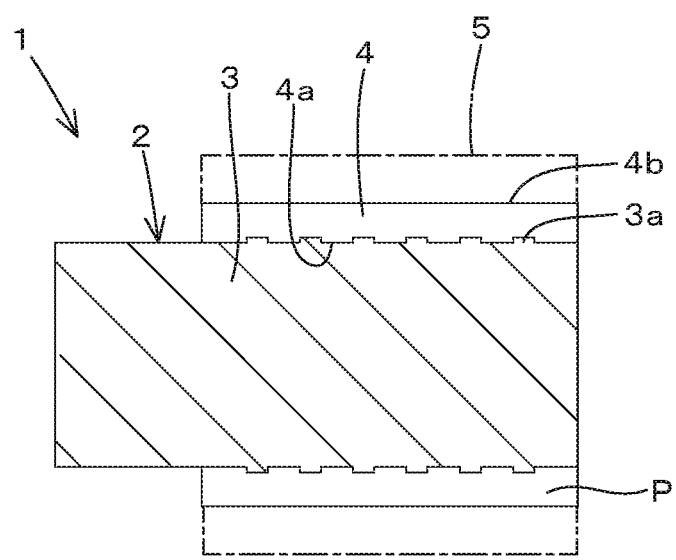
FIG. 3 is a cross section view in a Y-Y line of FIG. 1.

Referring to drawings, embodiments of the present invention will be described below.

A stator of an electric motor according to the present invention will be explained first.

FIG. 1 to FIG. 5 show the stator of the electric motor according to a first embodiment of the present invention. The stator 1 according to the first embodiment is applied to a synchronous electric motor employing embedded permanent magnets. The stator 1 includes a yoke 2, a tooth 3, an insulation member 4, and a winding wire 5. The York 2 has a circular shape. A plurality of the teeth 3 are arranged in a circumferential direction of an inner circumference of the yoke 2. The winding wire 5 is wound on the insulation member 4 disposed on the tooth 3.

The stator 1 according to the first embodiment is a stator chip constituting a stator that circularly couples the stator chips. In particular, as for the stator chip that is the stator 1 according to the first embodiment (hereinafter referred to as a split stator 1), a plurality of the stator chips are arranged in the circumferential direction and thus constitutes one circular stator. Each of the stators 1 (the stator chips, split iron cores) includes the yoke 2 (a split yoke) and one of the teeth 3 (a polar tooth portion) integrated with the yoke 2.

The stator 1 is formed of a plurality of silicon steel plates stacked with each other. The tooth 3 includes two surfaces A in a circumferential direction (surfaces on a slot side) (hereinafter referred to a circumferential surface A) and two surfaces B in an axial direction (in an axial direction of the stator) (hereinafter referred to an axial surface B), and has a rectangular shape in a cross section. A concave-convex portion 3a is formed on the circumferential surface A. The concave-convex portion 3a is formed also on the axial surface B.

The concave-convex portion 3a on the circumferential surface A of the tooth 3 is formed in manufacturing the stator 1 by pressing the silicon steel plate. The concave-convex portion 3a on the axial surface B is formed by applying the surface finishing to the silicon steel plate being on a surface side. The concave-convex portion 3a on the circumferential surface A forms a plurality of convex strips on the circumferential surface A in a direction of diameter (in a direction of diameter of the circular stator) at intervals. The concave-convex portion 3a on the axial surface B forms a plurality of convex strips on the axial surface B in the direction of diameter (in the direction of diameter of the circular stator) at intervals. The concave-convex portion 3a on the circumferential surface A and the concave-convex portion 3a on the axial surface B may be continuous or may be discontinuous.

The insulation member 4 is formed of elastic resin such as silicon rubber and PPT resin. The insulation member 4 has a square cylindrical shape surrounding the entire circumference of the tooth 3 having a rectangular shape in a cross section. The insulation member 4 forms concave-convex portion 4a on an inner surface of the insulation member, the inner surface being opposed to the circumferential surface A and the axial surface B of the tooth 3, the concave-convex portion 4a being configured to be fitted to the concave-convex portion 3a of the tooth 3.

That is, a concave groove and the convex strip are formed on the inner circumferential surface of the insulation member 4. The concave groove of the insulation member 4 is fitted to the convex strip on the circumferential surface A of the tooth 3 and to the convex strip on the axial surface B of the tooth 3. The convex strip of the insulation member 4 is formed between the concave grooves. The convex strip is fitted to the concave groove of the circumferential surface A of the tooth 3 and to the concave groove of the axial surface B of the tooth 3.

The convex strip of the tooth 3 is fitted to the concave groove of the insulation member 4, and thereby a surface of the convex strip contacts to a surface of the concave groove and surfaces other than the surfaces of the convex strip and the concave groove are contacted to each other. Thus, the concave-convex portion 3a on the circumferential surface A of the tooth 3 is fitted to the concave-convex portion 4a on the insulation member 4. In this manner, an area of contact between the insulation member 4 and the circumferential surface A of the tooth 3 is increased in comparison with a case with no concave-convex portion. In addition, an air space is hard to be formed between the insulation member 4 and the circumferential surface A of the tooth 3. In addition, a position of the fitting of the insulation member 4 is unmoved with respect to the tooth 3.

An outer surface 4b of the insulation member 4 is positioned outside the circumferential surface A and the axial surface B of the tooth 3, and the outer surface 4b is formed to have a circular arc shape intermediately bulging (a dome shape) in a winding direction of the winding wire 5. That is, the outer surface 4b of the insulation member 4 is formed to have a circular arc shape bulging at an intermediate portion between a starting end side and a terminal end side of the winding wire 5 in the winding direction.

The insulation member 4 includes an inner circumferential surface that is formed to have a square shape, and the insulation member 4 includes the outer surface 4b that is formed to have a shape similar to a circular arc shape. In this manner, the winding wire 5 is wound easily, and thereby an air space is not formed between the outer surface 4b and the winding wire 5.

Figure 4:
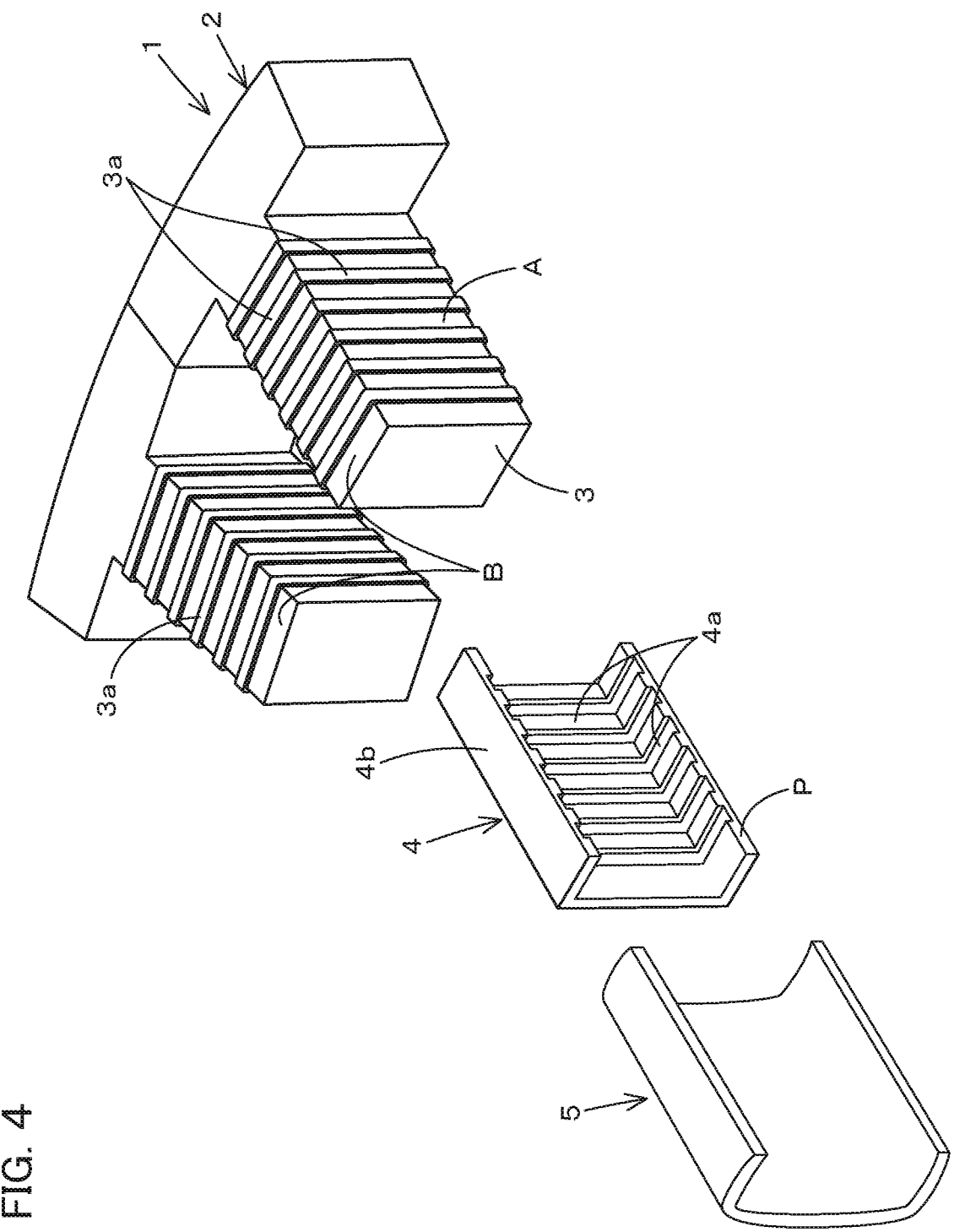
FIG. 4 is an exploded perspective view illustrating a split surface of an insulation member positioned to be opposed to a surface of a teeth in an axial direction of the teeth.

The insulation member 4 is constituted of a pair of two pieces surrounding an entire circumference of the tooth 3, that is, the insulation member 4 has a split shape. The insulation member 4, one of the two pieces, has a shape symmetric about the insulation member 4, the other one of the two pieces, and is opposed to the insulation member 4, the other one of the two pieces. The two pieces opposed to each other of the insulation member 4 surround the circumferential surface A and the axial surface B of the tooth 3. As shown in FIG. 4, a split surface P of the insulation member 4 is positioned opposed to the axial surface B of the tooth 3. As shown by virtual lines in FIG. 1 and FIG. 2, the insulation members 4 having the split shape each are fitted to the tooth 3 from the slot side.

Figure 5:
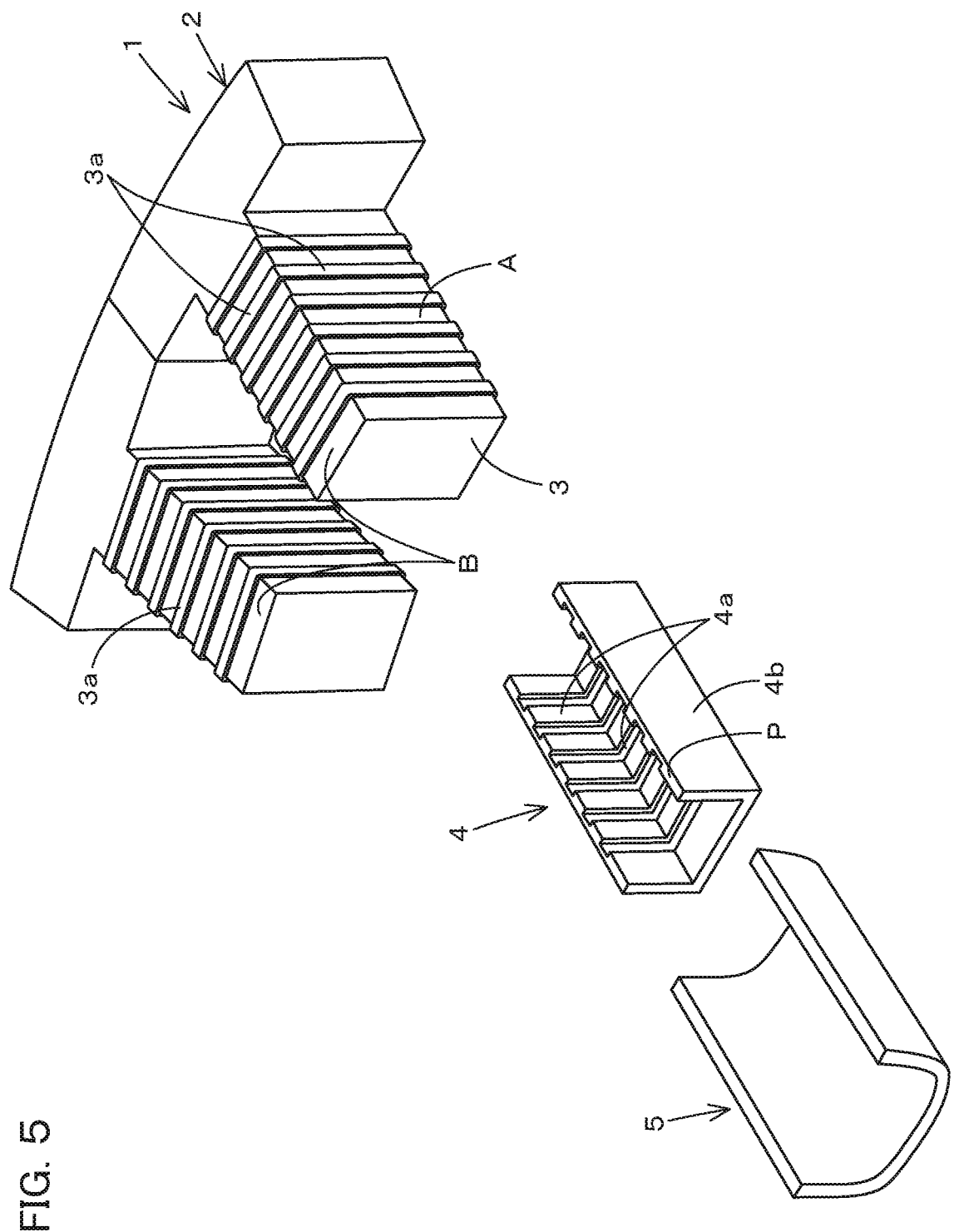
FIG. 5 is an exploded perspective view illustrating a split surface of the insulation member positioned to be opposed to a surface of a teeth in a circumferential direction of the teeth.

As shown in FIG. 5, the split surface P may be positioned opposed to the circumferential surface A of the tooth 3. In that case, the insulation members 4 having the split shape each are fitted to the tooth 3 from an axial side.

The winding wire 5 is wound in the concentrated winding. The insulation members 4 are fitted to the tooth 3, the winding wire 5 is tightly wound on the outer circumference of the insulation member 4 in the concentrated winding, and in this manner the split stator 1 is constituted, the split stator 1 having a required angle to the circumferential direction. And, the circular stator is constituted of the plurality of the split stator 1 arranged in the circumferential direction.

The split stator 1 includes the insulation members 4 that has the split shape and are fitted to the single tooth 3, and thus the concave-convex portion 3a is fitted to the concave-convex portion 4a formed on the inner surfaces of the insulation members 4, the concave-convex portion 3a being formed on the circumferential surface A and the axial surface B of the tooth 3. In this manner, the outer surface of the tooth 3 is tightly attached to the inner surfaces of the insulation members 4 under the states where the tight attachment increases the contacting area by the concave-convex portion, does not form the air space, and does not move the insulation members 4.

When the winding wire 5 is wound spirally in the concentrated winding on the insulation members 4 fitted to the tooth 3, the winding wire 5 is wound substantially circularly with respect to the tooth 3 having a square shape in a cross section since the outer surface 4b of the insulation member 4 has the circular arc shape intermediately bulging in the winding direction. In this manner, tightness of the attachment of the winding wire 5 to the outer surface 4b is improved. In addition, the winding wire 5 are curved mildly at the positions opposed to the edge portions of the tooth 3, and thus the winding wire 5 is attached to the insulation members 4 in a broad area.

When a spiral concave-convex portion (an attachment portion) 4c is formed on the outer surface 4b of the insulation member 4, the spiral concave-convex portion 4c being fitted to the winding wire 5 having a circular cross section, the winding wire 5 enters the concave portion of the spiral concave-convex portion 4c, and the convex portion of the spiral concave-convex portion 4c fills a space between the winding wires 5. In this manner, the insulation member 4 is tightly attached to the winding wire 5 under the states where the tight attachment increases the contacting area by the concave-convex portion, does not form the air space, and does not move the winding wire 5. In this manner, a process to wind the winding wire 5 spirally on the insulation members 4 will be easy.

As described above, the stator 1 forms the concave-convex portion 3a on the tooth 3, and the concave-convex portion 3a is fitted to the concave-convex portion 4a formed on the inner surface of the insulation member 4. In this manner, the tooth 3 is fitted tightly to the insulation member 4 in a broad area without the air space. Thus, a thermal conduction amount between the tooth 3 and the insulation members 4 is increased, and thereby a thermal resistance is reduced. And thus, a cooling efficiency of the motor is improved, and an assembly operability and a reliability are also improved. In this manner, a cooling structure such as a fin can be reduced, a power of a forced cooling system can be reduced, and a manufacturing cost can be reduced. In addition, the outer surface 4b of the insulation member 4 is formed to have a circular arc shape bulging at an intermediate portion, the spiral concave-convex portion 4c is formed, and thereby the winding wire 5 can be wound tightly on the outer surface 4b of the insulation member 4 in a large area with a small air space. In this manner, the winding wire 5 contacts to the insulation members 4 also at the positions opposed to the edge portions of the tooth 3, thereby suppressing the insulation breakdown and extending a life of the motor.

Figure 6:
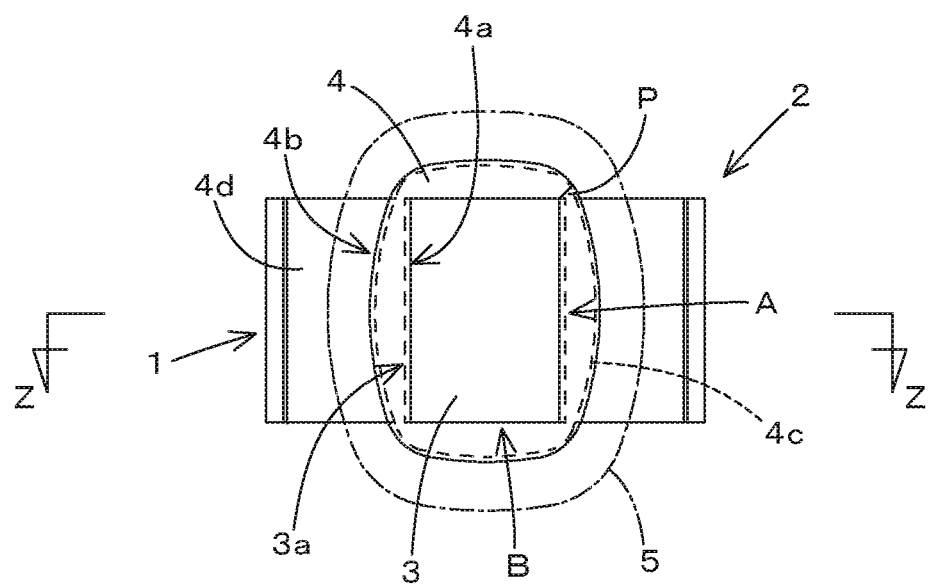
FIG. 6 is a front view illustrating a stator for an electric motor according to a second embodiment of the present invention.
Figure 7:
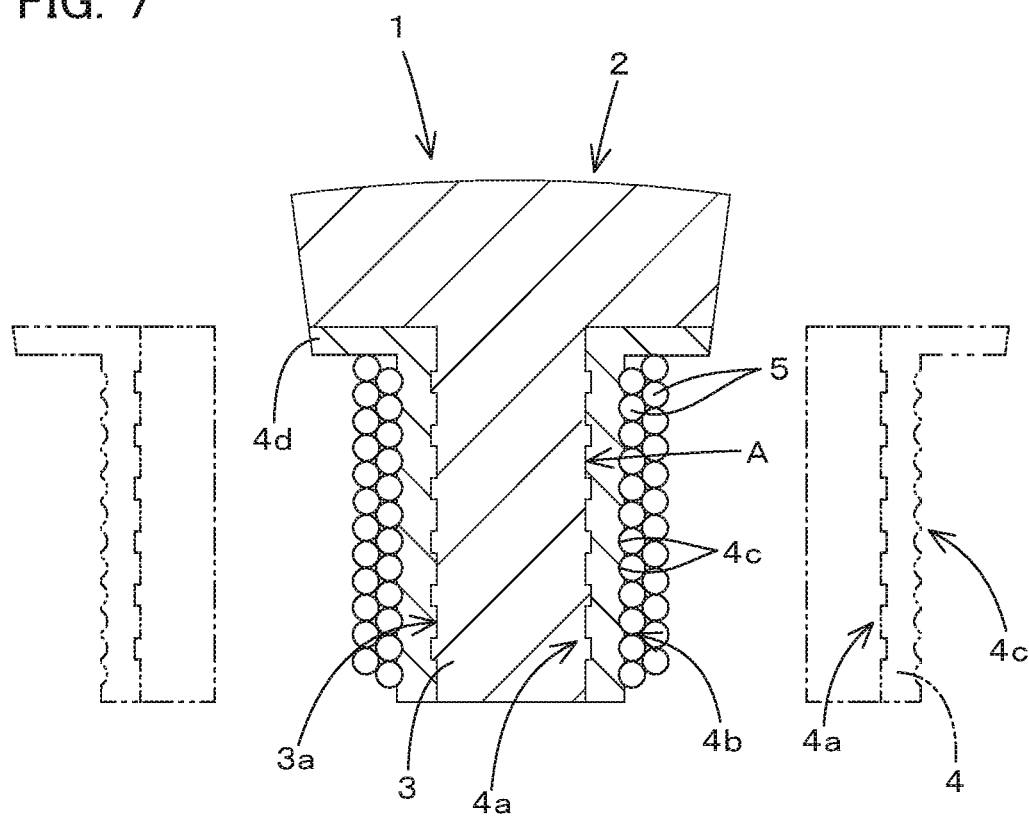
FIG. 7 is a cross section view in a Z-Z line of FIG. 6.

FIG. 6 and FIG. 7 illustrate a stator of an electric motor according to a second embodiment of the present invention. In the second embodiment, the insulation member 4 of the stator 1 includes the spiral concave-convex portion 4*c* and a slot insulation portion 4*d*. The spiral concave-convex portion 4*c* is formed on the outer surface 4*b* of the insulation member 4, the outer surface 4*b* being positioned outside the circumferential surface A and the axial surface B of the tooth 3. A plurality of the spiral concave-convex portions 4*c* are formed being arranged in a direction of diameter of the tooth 3. The winding wire 5 having a circular cross section is fitted into the spiral concave-convex portions 4*c*. The slot insulation portion 4*d* is formed extending along an inner circumferential surface of the yoke 2. In addition, the split surface P of the insulation member 4 is arranged on the position opposed to the edge portion of a corner portion of the tooth 3.

The spiral concave-convex portion 4*c* is formed on the outer surface 4*b* of the insulation member 4, the outer surface 4*b* having the circular arc shape bulging at the intermediate portion. In this manner, the concave portion of the spiral concave-convex portion 4*c* guides the winding of the winding wire 5 and provides a large area for tightly attaching the winding wire 5 to the outer surface 4*b* of the insulation member 4. In addition, the convex portion between the concave portions of the spiral concave-convex portion 4*c* fills a space between the winding wires 5 adjacent to each other and thus reduces the air space, and thereby increasing the thermal conduction amount.

When the insulation member 4 is formed of elastic resin having a low hardness, the spiral concave-convex portion 4*c* is formed naturally by tightly winding the winding wire 5. However, when the spiral concave-convex portion 4*c* is formed by preliminarily forming a deep spiral concave portion on the insulation member 4, the tight attachment area is significantly increased and the air space is significantly reduced.

The insulation member 4 according to the second embodiment is fitted to the tooth 3 from the outside after widely opening the single split surface P; however, the split surfaces P may be formed in diagonal positions of the tooth 3, and thus the insulation member 4 may be split by a diagonal line in two pieces. In addition, not only the insulation member 4 fitted to the tooth 3 is capable of providing the insulation between the winding wire 5 and the tooth 3 but also the slot insulation portion 4*d* is capable of providing the insulation between the winding wire 5 and the yoke 2.

Meanwhile, in the second embodiment, the concave-convex portion 3*a* is formed only on the circumferential surface A of the tooth 3, and the concave-convex portion 3*a* is not formed on the axial surface B. Thus, the concave-convex portion 4*a* is formed only on the circumferential surface A, the concave-convex portion 4*a* being fitted to the concave-convex portion 3*a*.

Figure 8:
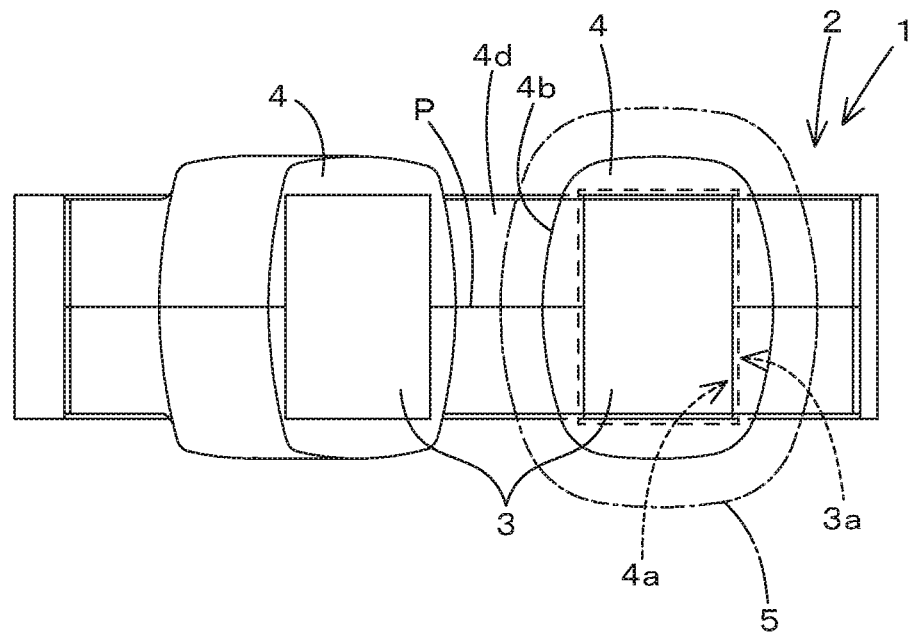
FIG. 8 is a view a front view illustrating a stator for an electric motor according to a third embodiment of the present invention.
Figure 9:
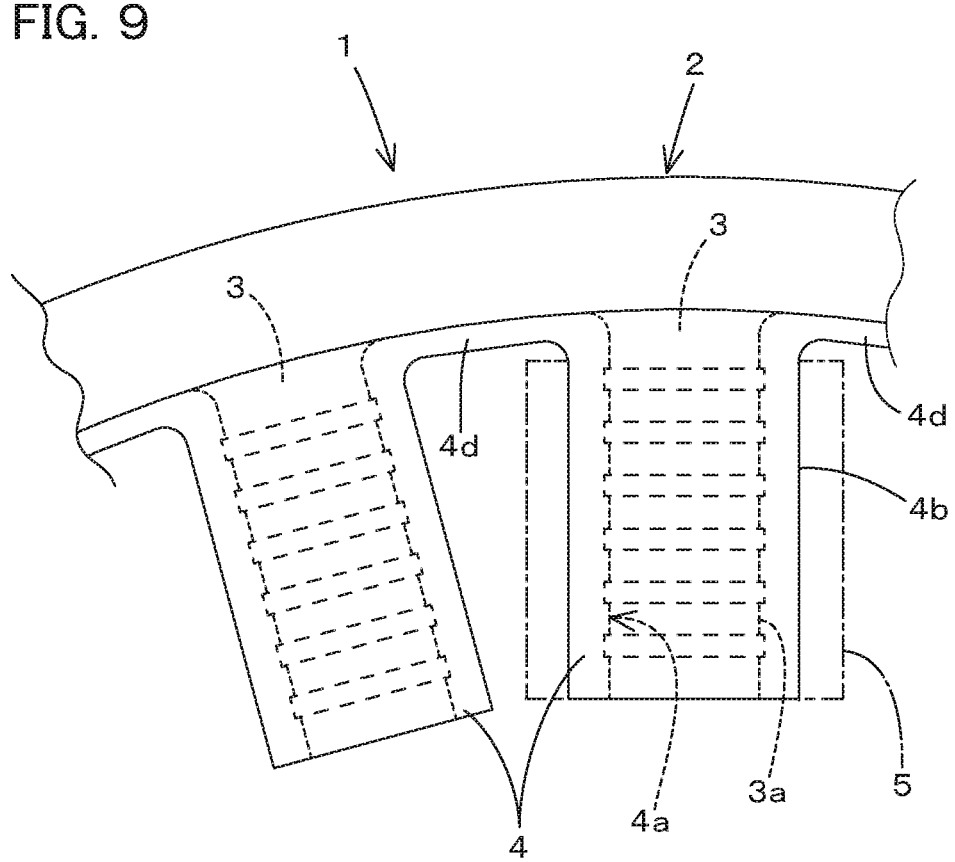
FIG. 9 is a plan view illustrating the stator for the electric motor according to the third embodiment of the present invention.
Figure 10:
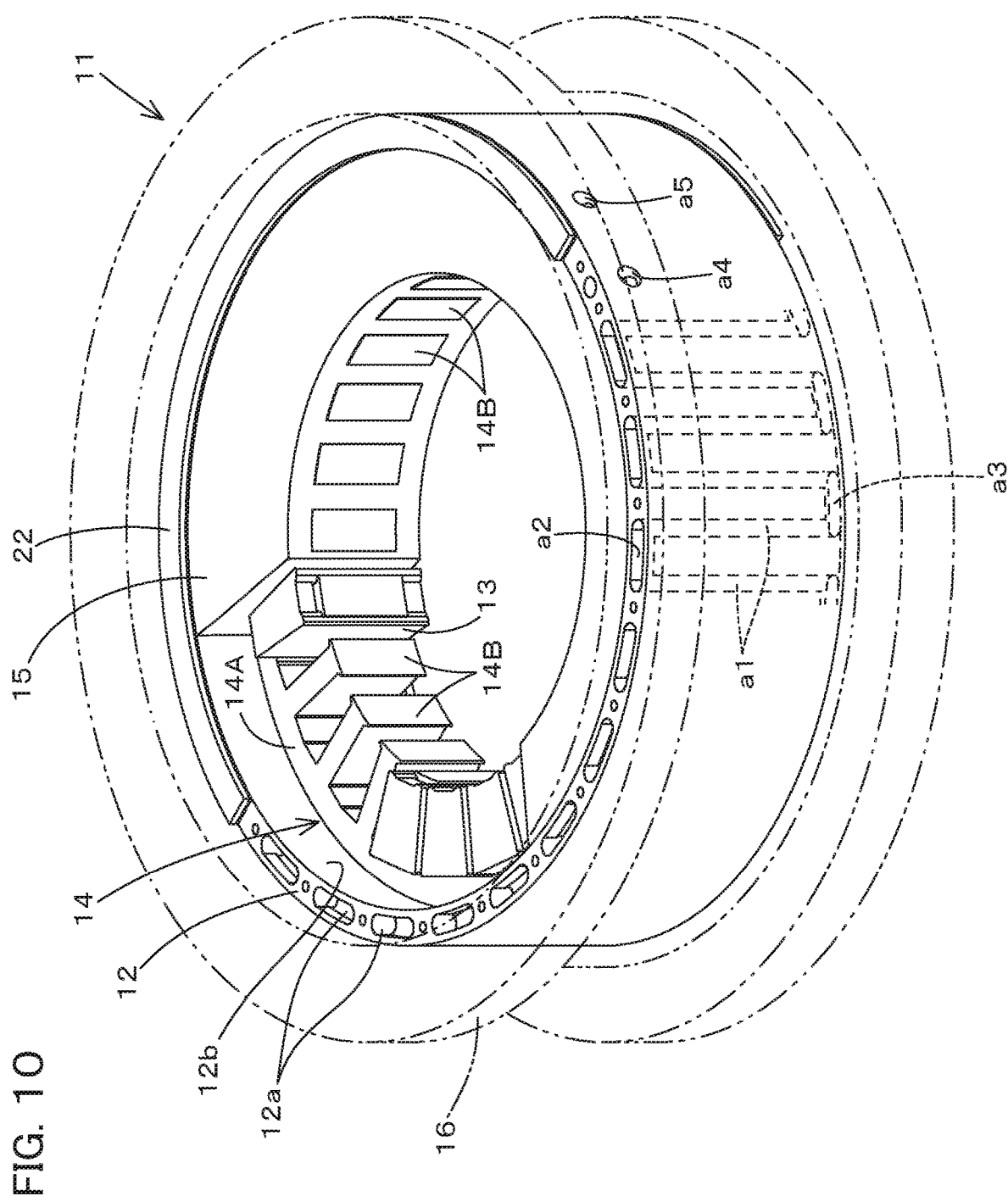
FIG. 10 is a perspective explanation view illustrating a cooling structure for an electric rotating machine according to a first embodiment of the present invention.
Figure 11:
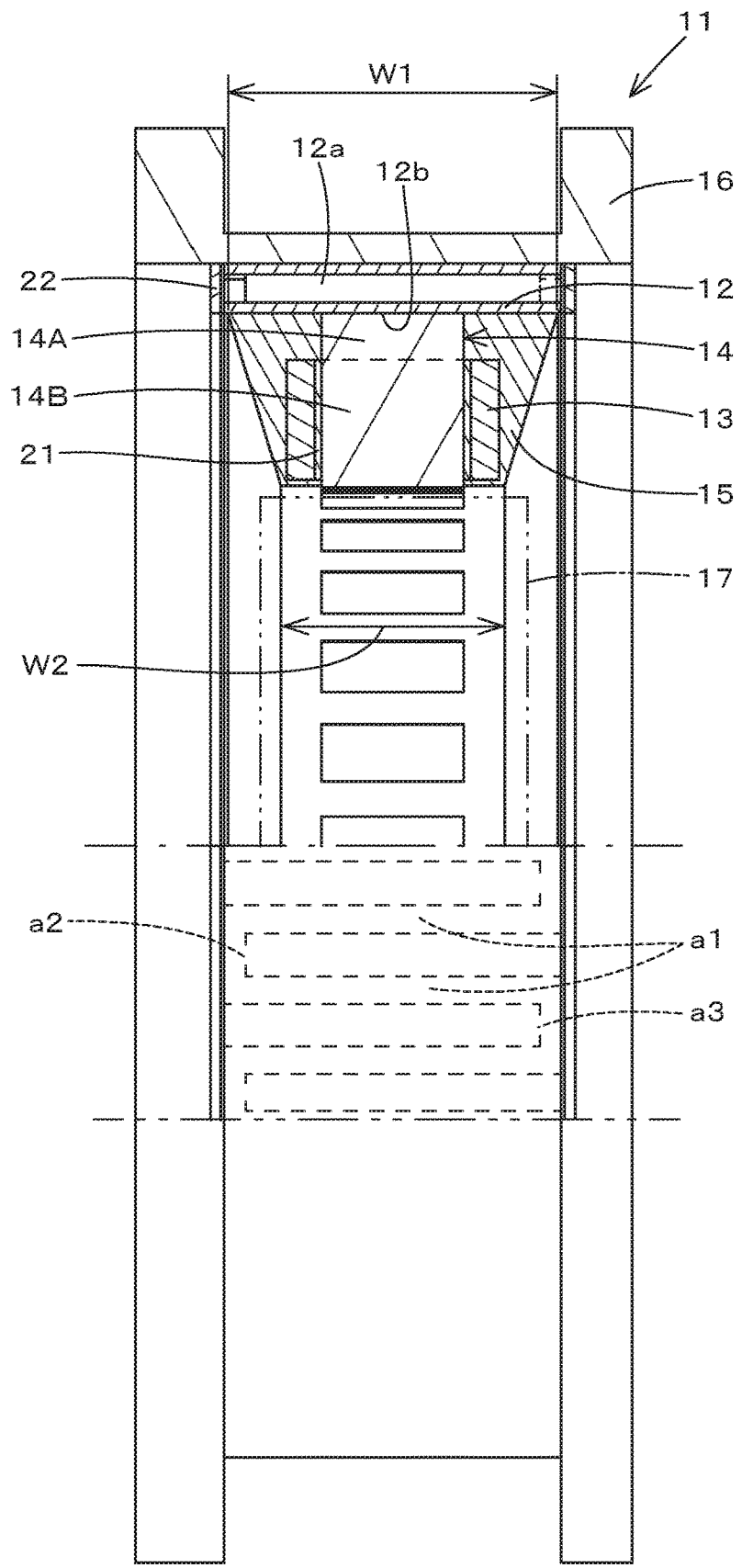
FIG. 11 is a front view illustrating a partial cross section of the cooling structure for the electric rotating machine according to the first embodiment of the present invention.
Figure 12:
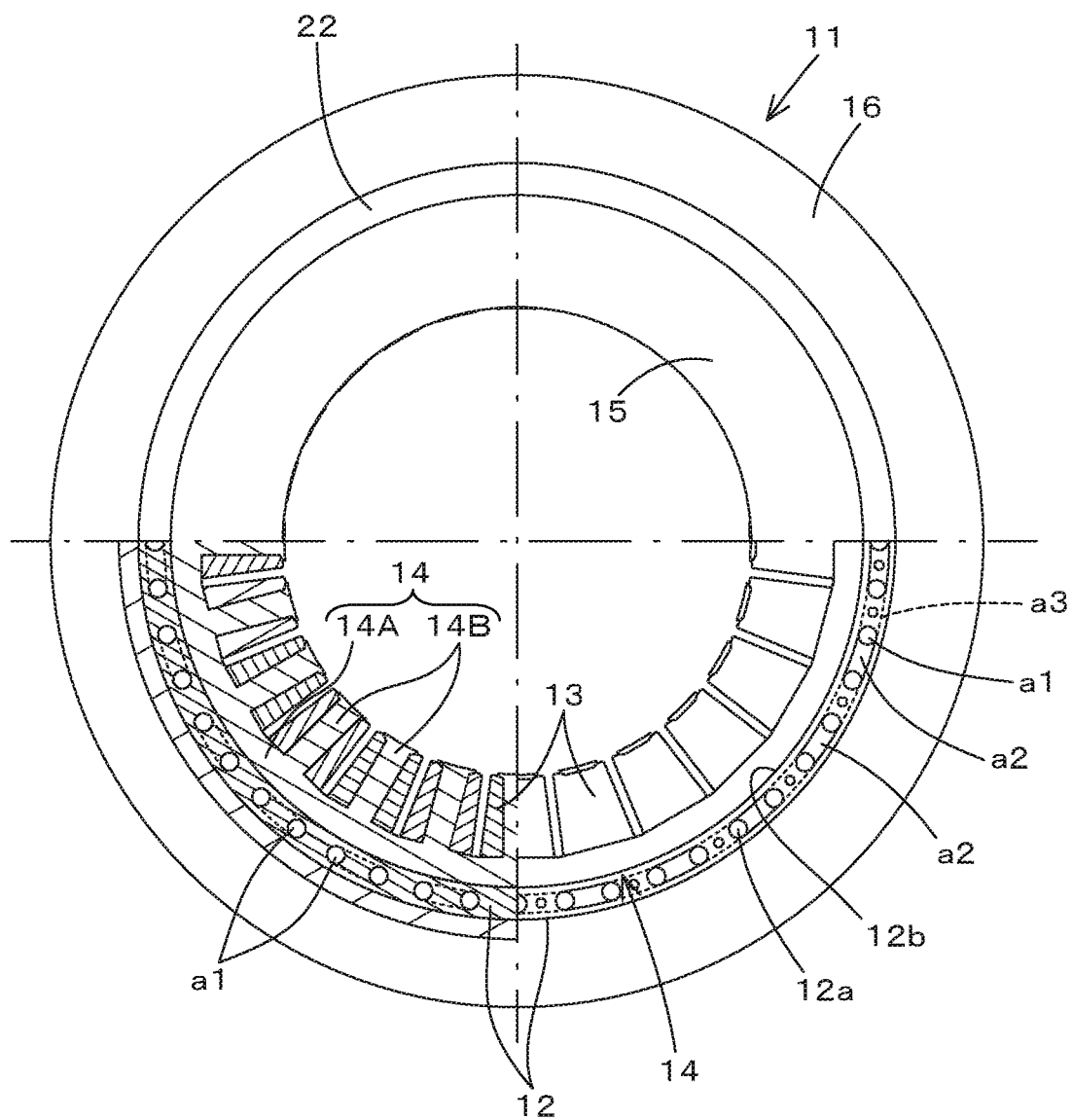
FIG. 12 is an explanation view of a side view illustrating fracture surfaces in different layers of the cooling structure for the electric rotating machine.
Figure 13:
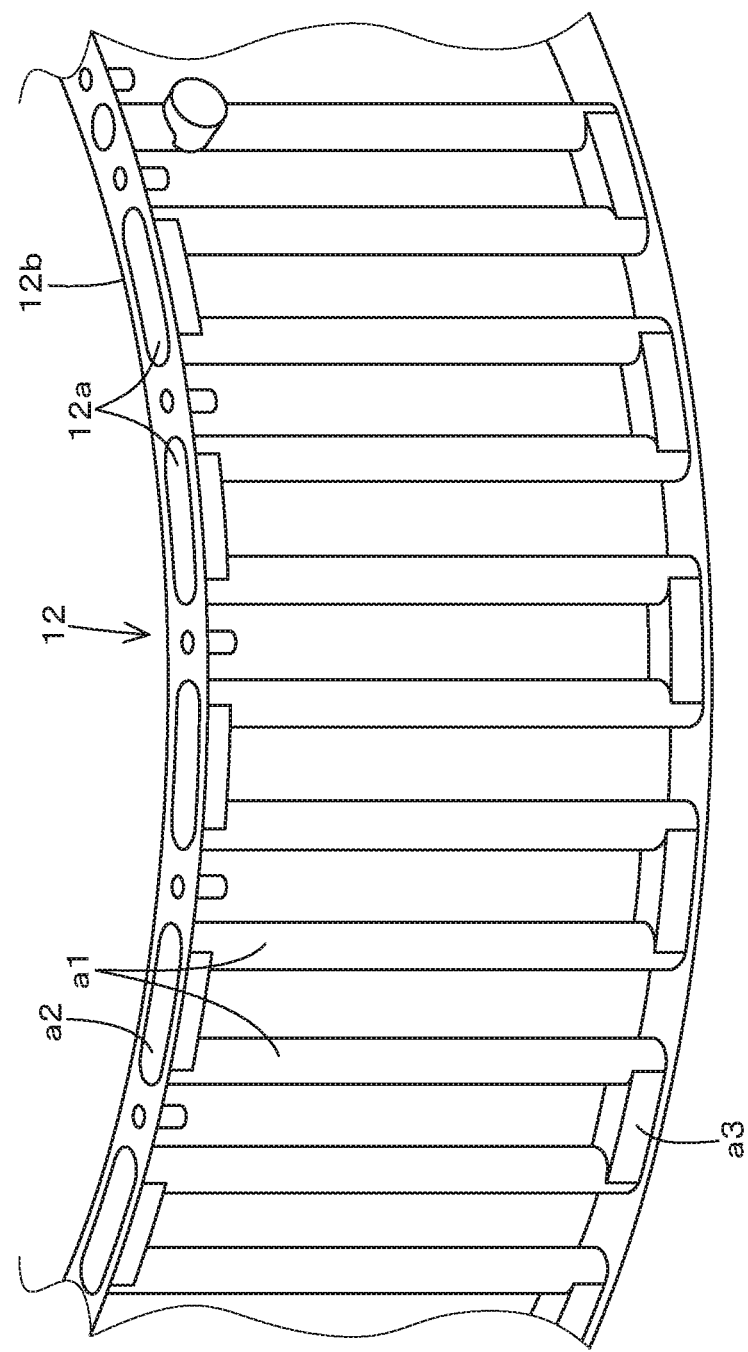
FIG. 13 is a perspective explanation view illustrating a jacket channel of a water jacket.

FIG. 8 and FIG. 9 illustrate a stator of an electric motor according to a third embodiment. In the third embodiment, the stator 1 is not split and has a circular shape. A plurality of teeth 3 are formed in the circumferential direction integrally on an inner circumference side of the circular yoke 2. The insulation member 4 is constituted of a pair of two pieces divided in the axial direction. The winding wire 5 is wound in the concentrated winding or in the distributed winding.

The concave-convex portion 3*a* is formed on the entire circumferences of the circumferential surface A and the axial surface B of the tooth 3. The concave-convex portion 4*a* is also formed on the entire circumference of the inner circumferential surface of the insulation member 4.

The slot insulation portion 4*d* is formed integrally on the insulation member 4, the slot insulation portion 4*d* extending from a portion fitted to the tooth 3 along an inner circumferential surface of the yoke 2. The slot insulation portions 4*d* adjacent in the circumferential direction are integrally formed. The insulation member 4 is constituted of a pair of two pieces, the insulation member 4 having a circular shape and has a shape symmetric in the axial direction. The insulation member 4, one of the two pieces, is opposed to the insulation member 4, the other one of the two pieces, and the two pieces opposed to each other are fitted to all of the teeth 3 together.

The insulation member 4 according to the third embodiment may be divided in plural pieces along the circular yoke 2. In addition, the single insulation member 4 may be fitted to the plurality of teeth 3 at the same time.

A cooling structure for an electric rotating machine of the present invention will be explained next.

FIG. 10 to FIG. 13 illustrate a cooling structure for an electric rotating machine according to a first embodiment. FIG. 10 to FIG. 13 show a fixation side of a flat and thin synchronous electric motor 11 (an electric rotating machine 11). The electric rotating machine 11 includes a water jacket 12, a winding wire 13, a stator 14, a thermal conductor 15, and a motor housing 16. The stator 14 having a circular shape is disposed on an inner circumference of the water jacket 12. The stator 14 includes a plurality of teeth 14B. The winding wire 13 is wound on the tooth 14B. The thermal conductor 15 is molded on an inner circumference surface 12*b* of the water jacket 12 in the mold forming and covers the winding wire 13 and the stator 14. The water jacket 12 is attached in the motor housing 16. A rotor 17 using embedded permanent magnets (illustrated in FIG. 11) is arranged inside the stator 14.

The water jacket 12 is formed of aluminum alloy having a high thermal conductivity and has a cylindrical shape. A jacket channel 12*a* is formed inside the water jacket 12, the jacket channel 12*a* having a zigzag shape extending in a circumferential direction. The jacket channel 12*a* includes a straight hole a1, a communication groove a2, and a communication groove a3. The straight hole a1 is a hole (a channel) extending along an axial direction, and a plurality of the straight holes a1 are formed by boring an inside of the jacket channel 12*a* parallel in the circumferential direction. The communication groove a2 communicates with one ends of the straight holes a1 adjacent to each other. The communication groove a3 communicates with the other end of the straight hole a1 and with the other end of the other straight hole a1 adjacent to the straight hole a1.

The communication grooves a2 and a3 are closed by seal rings 22 arranged on both end of the water jacket 12 in the axial direction. The jacket channel 12*a* is formed within a width of water jacket 12, the width extending between both ends of the water jacket 12 in the axial direction.

The both ends of the jacket channel 12*a* are opened on an outer circumferential surfaces of the water jacket 12. One of the both ends of the jacket channel 12*a* serves as a coolant supply port a4, and the other one of the both ends serves as a coolant supply port a5. The coolant supply port a4 and the coolant supply port a5 are connected to a coolant circulating device disposed outside, and allow a cooling medium such as cooled water and oil to be circulated.

The stator 14 arranges a plurality of the teeth 14B in the circumferential direction, the tooth 14B projecting on the inner circumference of the circular yoke 14A. The tooth 14B has a shape getting broad toward the tip end, and the winding wire 13 is wound on the insulation member 21 on the body portion of the tooth 14B. The thermal conductor 15 formed of resin having a high thermal conductivity is molded entirely on the stator 14, leaving inside ends of the teeth 14B and the winding wires 13 in a diameter direction.

The stator 14 is a yoke integration type projecting the plurality of teeth 14B on the inner circumference of the single circular yoke 14A. However, the stator 14 may be a stator-chips circular coupling type. That is, the stator 14 forms a stator chip consisting of a split yoke and one of the teeth 14B (a polar tooth portion) integrated with the split yoke, and a plurality of the stator chips arranged in the circumferential direction may constitute one circular stator.

The stator 14 is formed of a plurality of silicon steel plates stacked with each other. The tooth 14B includes two surfaces in the circumferential direction (surfaces on a slot side) and two surfaces in the axial direction (in an axial direction of the stator), and has a rectangular shape in a cross section.

The insulation member 21 is formed of an aramid insulation paper or resin such as PPS (PolyPhenyleneSulfide) resin. The insulation member 21 is formed to have a square cylindrical shape surrounding an entire circumference of the tooth 14B having a rectangular shape in a cross section or is constituted of a pair of two pieces surrounding the entire circumference of the tooth 14B, that is, the insulation member 4 has a split shape.

The winding wire 13 is wound in the concentrated winding. The insulation members 21 are fitted to the tooth 14B, and the winding wire 13 is tightly wound on the outer circumference of the insulation members 21 in the concentrated winding.

The thermal conductor 15 is the resin having a high thermal conductivity (for example, the resin having a thermal conductivity 3 to 5 Wm2K). The stator 14 is arranged in a metal mold, the metal mold is filled with the resin (the thermal conductor 15), then the spaces between the winding wires 13 are also filled with the resin (the thermal conductor 15), and thereby an outer shape of the thermal conductor 15 is formed to have a rectangular shape in a cross section or other shapes.

The stator 14 is fitted into the water jacket 12, the water jacket 12 is used for a part of the metal mold, the high thermal conductivity resin is injected or transferred to fill the metal mold, and thereby the thermal conductor 15 is formed. The high thermal conductivity resin serves as a filler filled into a space and a gap around the winding wire 13 and the stator 14 on a side of the inner circumference surface 12b of the water jacket 12. In this manner, the stator 14 is fixed to the water jacket 12 without the shrink fitting.

The thermal conductor 15 has tapered side surfaces at both side in the axial direction of the stator 14. The thermal conductor 15 has a width W1 on an outer side of a diameter of the stator and a width W2 on an inner side of the diameter of the stator, the width W1 being wider than the width W2, and an outer circumference portion of the width W1 corresponds to a full width of the water jacket 12 in the axial direction of the water jacket 12. In this manner, the heat is conducted from the entire outer circumference surface of the thermal conductor 15 to the water jacket 12.

The thermal conductor 15 may be formed to have an even width from the outer circumference portion to the inner circumference portion. However, the thermal conductor 15 may reduce usage of material by having a sector shape or a trapezoid shape with the inner circumference portion narrowed in a cross section in the circumference direction.

The motor housing 16 is formed of a casting using iron such as the FC (The gray cast iron (also referred to as the plain cast iron)) and the FCD (the ductile cast iron). The motor housing 16 is fitted and attached to an outer circumference of the water jacket 12 formed separately.

The FC, FCD, and the like have the tensile strength 200 to 500 MPa and the thermal conductivity 20 to 40 W/(mK). The aluminum alloy has the tensile strength 300 MPa and the thermal conductivity 130 to 180 W/(mK). The aluminum alloy with the high thermal conductivity is employed for the water jacket 12, and the casting using iron with the tensile strength of 300 MPa or more is employed for the motor housing serving as an external case. In this manner, the motor housing 16 serves as a structural strength member for the strength protection for the water jacket 12.

Figure 14:
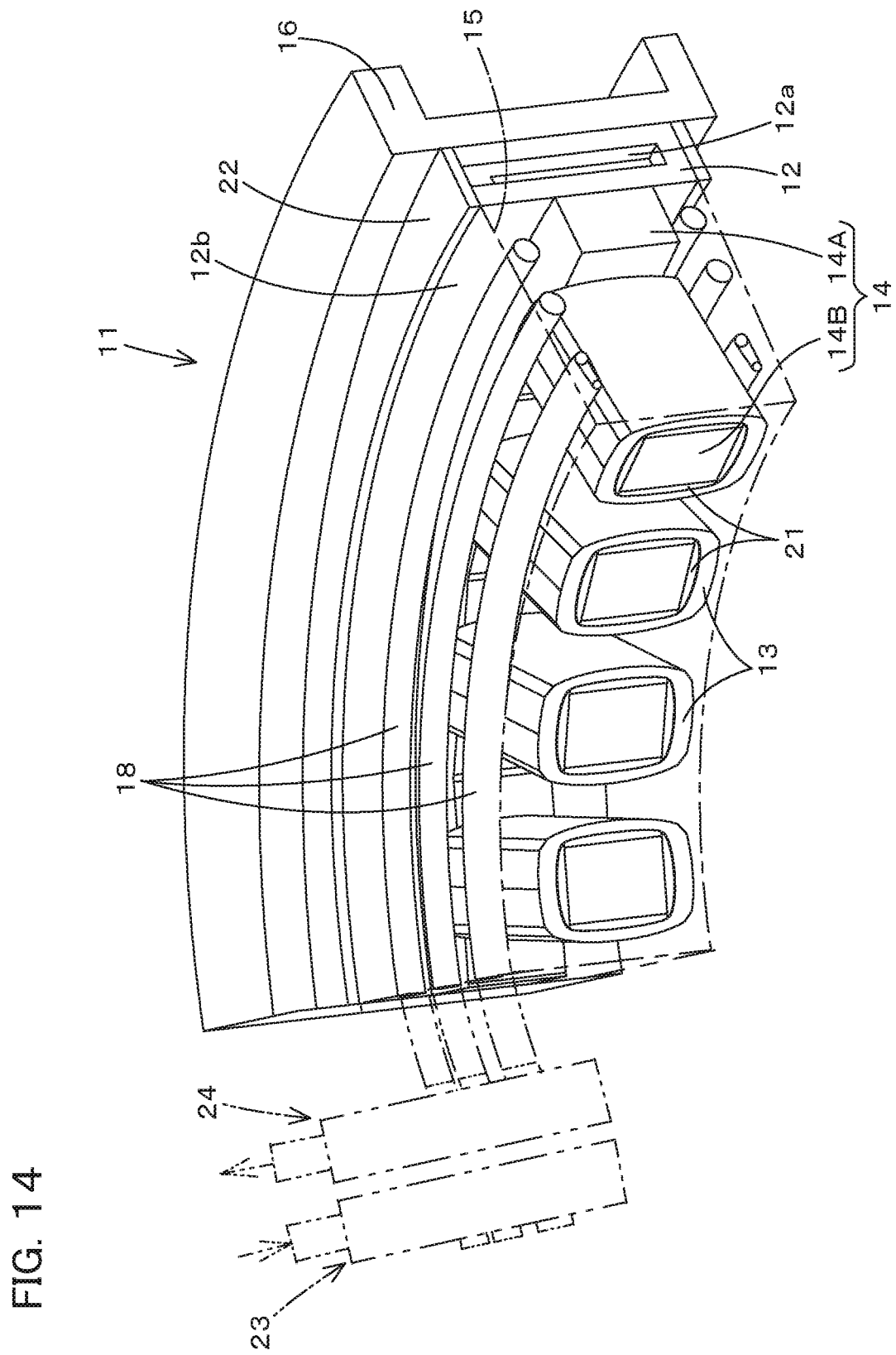
FIG. 14 is a perspective explanation view illustrating a cooling structure for an electric rotating machine according to a second embodiment of the present invention.
Figure 15:
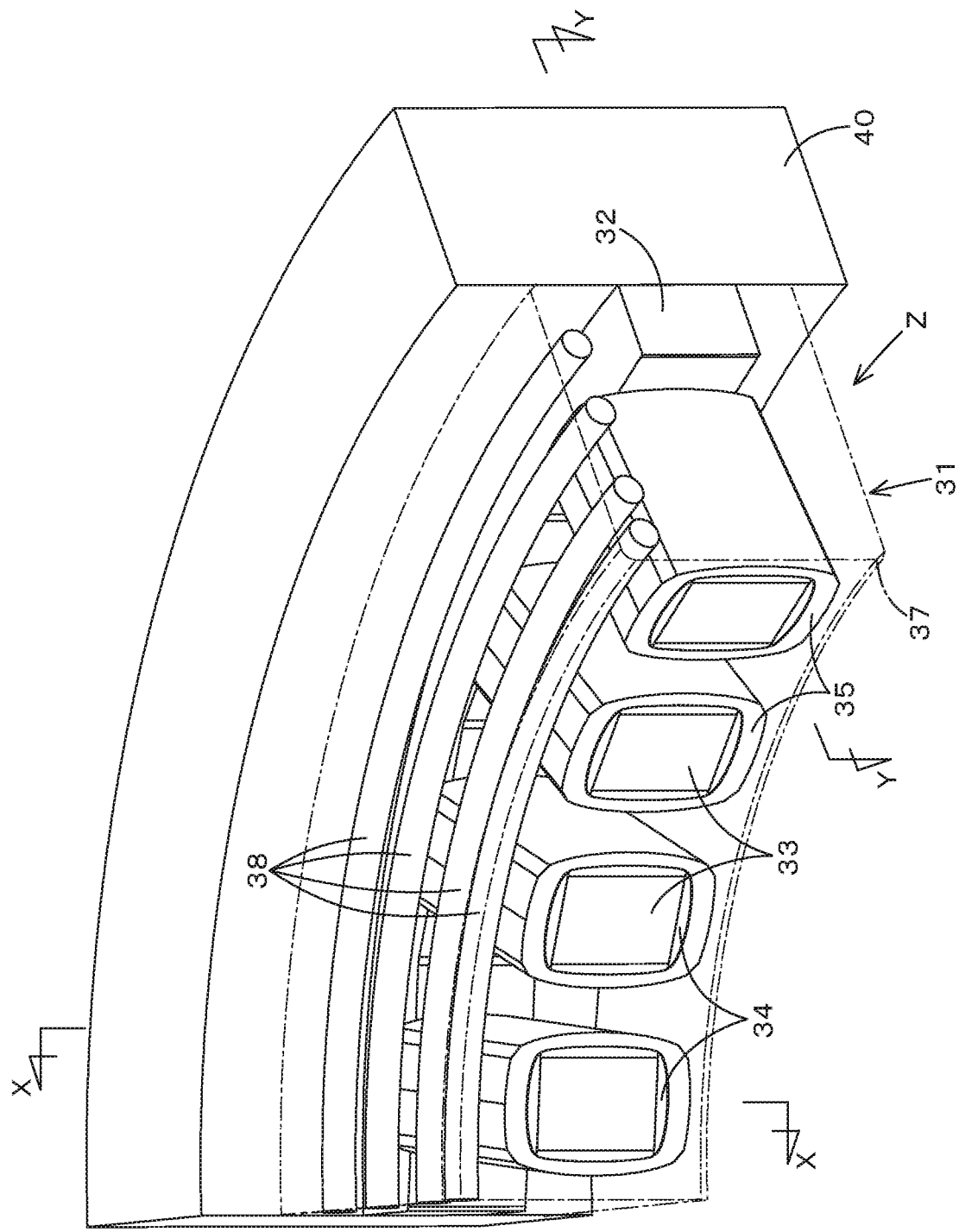
FIG. 15 is a perspective view illustrating a cooling structure for an electric rotating machine according to a third embodiment of the present invention.
Figure 16:
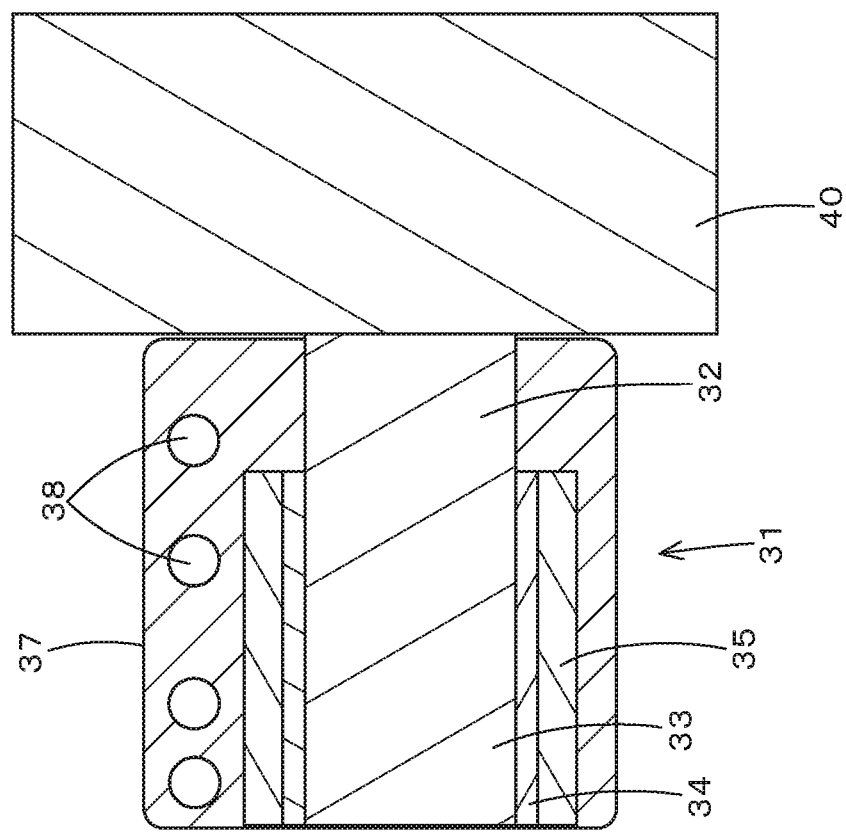
FIG. 16 is a cross section view in an X-X line of FIG. 15.
Figure 17:
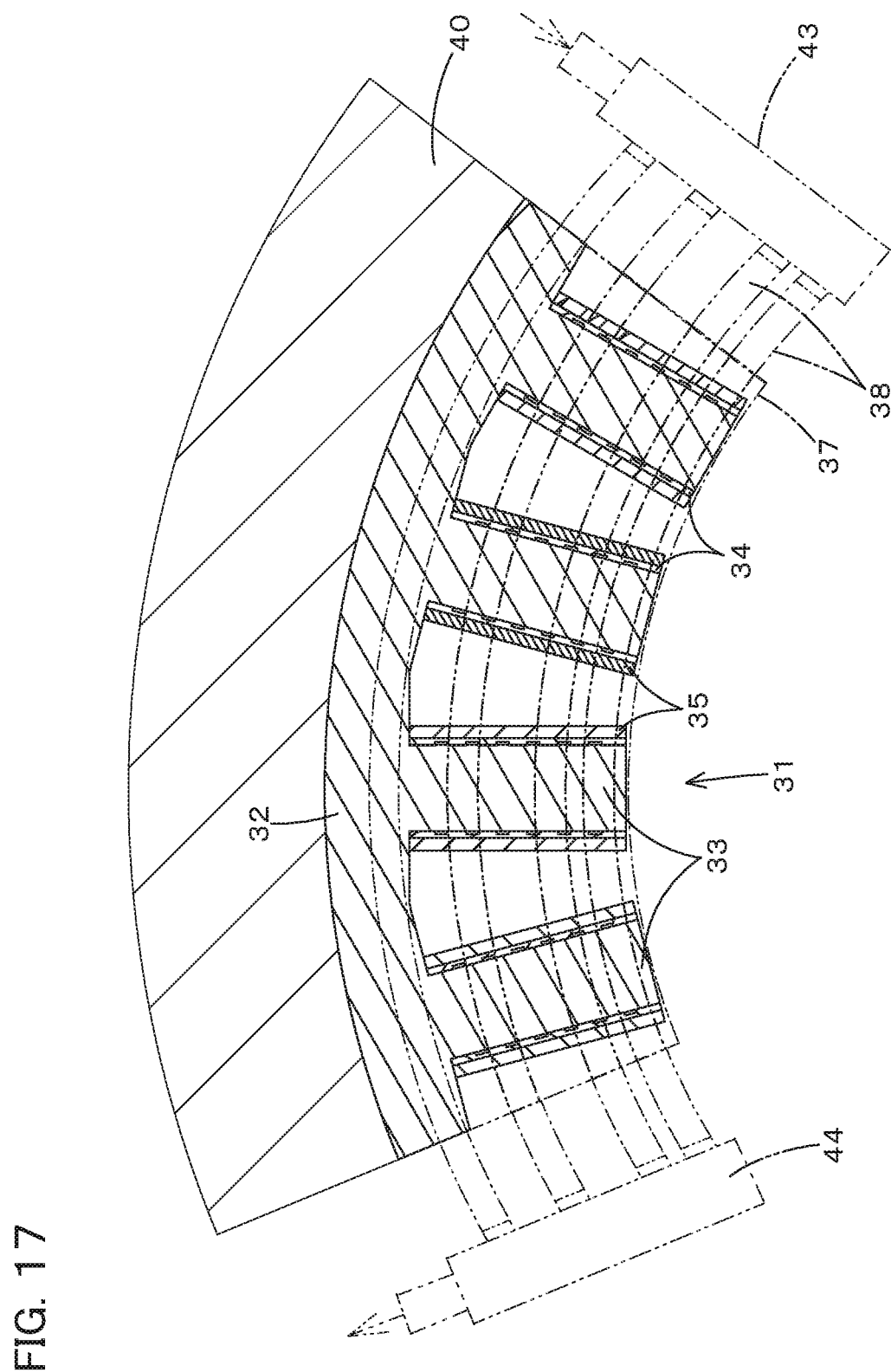
FIG. 17 is a cross section view in an X-X line of FIG. 16.
Figure 18:
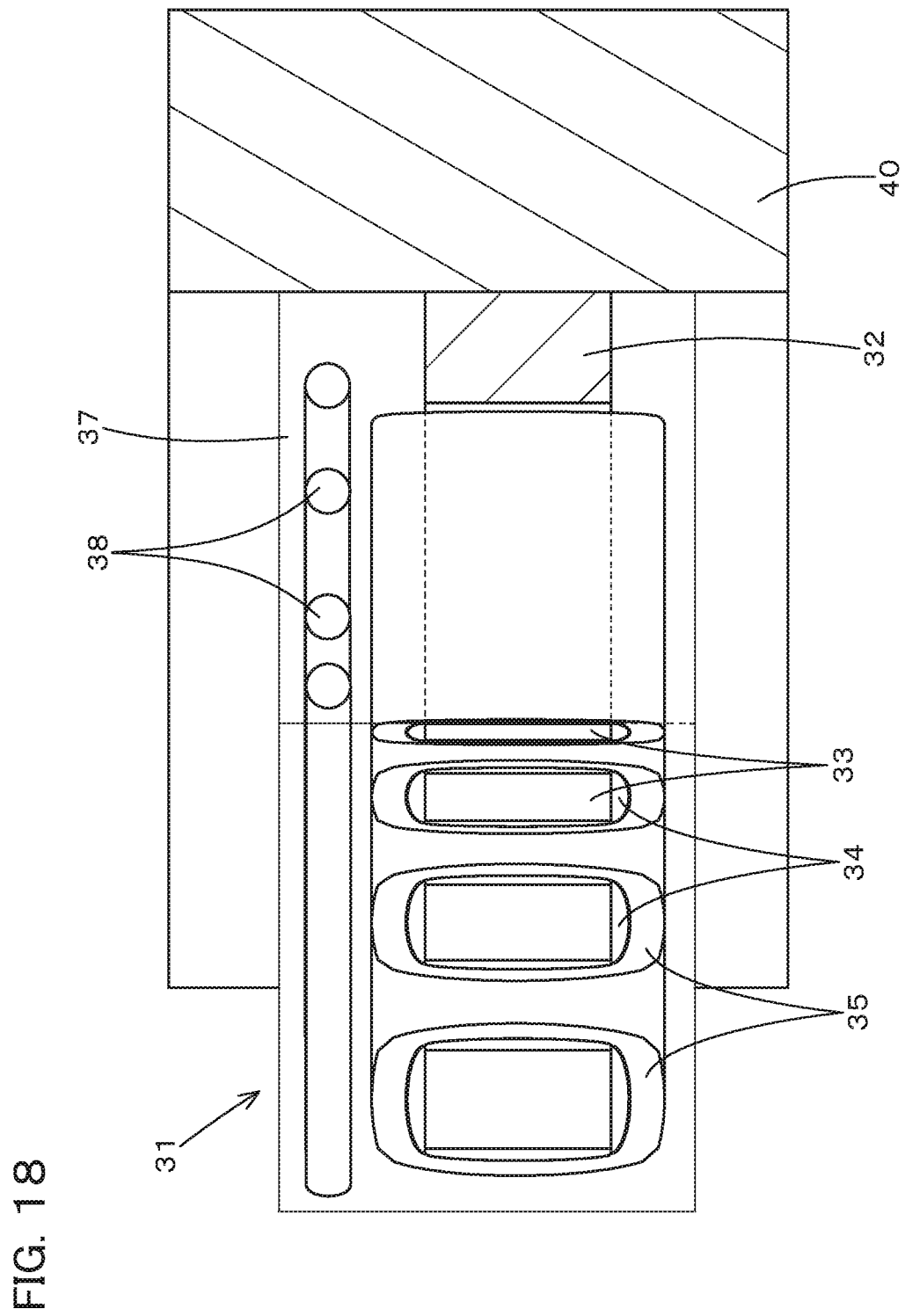
FIG. 18 is a view illustrating a view seen in a direction of an arrowed line Z of FIG. 15.

In a cooling structure for an electric rotating machine according to a second embodiment shown in FIG. 14, the water jacket 12 is installed in the motor housing 16 on the fixation side of the electric rotating machine 11. The stator 14 wound by the winding wire 13 is disposed on the inner circumference of the water jacket 12. The thermal conductor 15 is molded on the inner circumference surface 12b of the water jacket 12 in the mold forming and covers the winding wire 13 and the stator 14. A coolant channel 18 is formed inside the thermal conductor 15.

The water jacket 12 is formed of aluminum alloy having a high thermal conductivity and has a cylindrical shape. A jacket channel 12a is formed inside the water jacket 12, the jacket channel 12a having a zigzag shape extending in a circumferential direction. The stator 14 is formed of a plurality of silicon steel plates stacked with each other. The tooth 14B does not have the shape getting broad toward the tip end, and has a rectangular shape in a cross section from the body portion to the tip end of the tooth 14B. The insulation member 21 is formed of elastic resin. The winding wire 13 is wound on the outer circumference of the insulation member 21 in the concentrated winding.

The stator 14 is arranged in a metal mold, the metal mold is filled with the resin having a high thermal conductivity, and thereby the thermal conductor 15 is formed in the mold forming. In the mold forming, the coolant channel 18 is formed by inserting a resin tube, a metal tube, a rod core formed of thermally-melting material, or the like in the metal mold, the resin tube, the metal tube, and the rod core being formed in a circular shape.

The thermal conductor 15 has a width gradually narrowed from an outer circumference portion to an inner circumference portion in the axial direction of the stator 14, the outer circumference portion contacting to the water jacket 12. However, the thermal conductor 15 may be formed to have an even width from the outer circumference portion to the inner circumference portion. The thermal conductor 15 forms a plurality of the coolant channel 18 between the stator 14 and the both side surfaces in the axial direction.

Three coolant channels 18 are formed on each of the both sides in the axial direction of the stator 14. In particular, two of the coolant channels 18 are arranged on a position being overlapped with the winding wire 13 and the tooth 14B, and the remaining one of the coolant channels 18 is arranged on a position being overlapped with the yoke 14A. The three coolant channels 18 are each looped to have a concentric circular shape. A coolant supply port member 23 in common use is disposed on one ends of the three coolant channels 18, and a coolant discharge port member 24 in common use is disposed on the other ends of the three coolant channels 18.

Meanwhile, the coolant channel 18 may be disposed only on one side surface of the stator 14, and the number of the coolant channels 18 may be one or more other than three.

The coolant supply port member 23 and the coolant discharge port member 24 are connected to a coolant circulating device disposed outside the stator 14. In this manner, a cooling medium such as cooled water and oil is allowed to be supplied to the coolant supply port member 23, to be circulated in the coolant channels 18, and to be discharged from the coolant discharge port member 24.

The three coolant channels 18 may be formed by spirally winding one channel thrice. In that case, the coolant supply port member 23 is connected to one end portion of the channel, and the coolant discharge port member 24 is connected to the other end portion.

Of the three coolant channels 18, the coolant channel 18 on the outer circumference side and the coolant channel 18 on the intermediate circumference side have a circular shape in a cross section. and the coolant channel 18 on the inner circumference side is deformed to have an oval shape in a cross section. The coolant channel 18 may have a circular shape, an oval shape, a rectangular shape, or other shapes in the cross section. It is required to arrange one or more coolant channels 18 on at least one side surface in the axial direction of the stator 14. The coolant channel 18 can be arranged on a position overlapped with the yoke 14A, and however is arranged on at least a position overlapped with the winding wire 13, that is, a position allowing the coil end to be cooled.

The coolant channel 18 may be arranged in the thermal conductor 15 in a form of a lattice shape or a zigzag shape extending in the circumferential direction. In addition, the coolant channel 18 may enter between the winding wires 13 adjacent to each other in the circumference direction from a side of the winding wire 13, and may be arranged threading the winding wires 13 adjacent to each other in the circumference direction.

The electric rotating machine 11 conducts a resistance heat generated in the winding wire 13 and the tooth 14B to the water jacket 12 through the yoke 14A and absorbs the resistance heat in the water jacket 12, and also absorbs the resistance heat in the thermal conductor 15 being filled between the winding wires 13 and covering the tooth 14B and the yoke 14A, the thermal conductor 15 being formed of resin having a high thermal conductivity. In addition, an entire wide outer circumference surface of the thermal conductor 15 contacts to the water jacket 12 formed of material having a high thermal conductivity in addition to a direct thermal conduction from the yoke 14A, and thereby conducting the resistance heat to the water jacket 12 with the raised thermal conductivity. The water jacket 12 can provide the efficient cooling using the coolant flowing in the jacket channel 12a that is formed in the entire width of the water jacket 12. When the water jacket 12 is used for a part of the metal mold, the thermal conductor 15 is easily formed in the mold forming. Further, the stator 14 can be attached to the water jacket 12 by the thermal conductor 15, and the water jacket 12 can be reinforced by the motor housing 16 that is a member having a structurally high strength.

When the coolant is supplied to the coolant channel 18 formed in the thermal conductor 15, the thermal conductor 15 itself is cooled at a position closer to the winding wire 13 than the thermal conduction path through the yoke 14A, and thus the resistance heat is removed to further improve the cooling efficiency. The coolant channel 18 is formed integrally in the thermal conductor 15, and thus the number of components can be reduced.

FIG. 15 to FIG. 18 illustrate a cooking structure for an electric rotating machine according to a third embodiment. In the third embodiment, FIG. 15 to FIG. 18 show a stator 31 applied, for example, to asynchronous electric motor (the electric rotating machine) having a rotor that uses embedded permanent magnets. The stator 31 is pressed into a circular external case 40 and fitted to an internal circumference surface of the external case 40.

The stator 31 includes a yoke 32, a tooth 33, and a winding wire 35. The yoke 32 has a circular shape. A plurality of the teeth 33 are arranged in a circumferential direction of an inner circumference of the yoke 32, the teeth 33 projecting on the inner circumference of the yoke 32. The winding wire 35 is wound on the insulation member 34 disposed on the tooth 33. A thermal conductor 37 is molded entirely on the stator 31, leaving inside ends of the teeth 33 and the winding wires 35 in a diameter direction. A coolant channel 38 is formed inside the thermal conductor 37.

The stator 31 is a yoke integration type projecting the plurality of teeth 33 on the inner circumference of the single circular yoke 32. However, the stator 31 may be a stator-chips circular coupling type. That is, the stator 31 forms a stator chip consisting of a split yoke and one of the teeth 33 (a polar tooth portion) integrated with the split yoke, and a plurality of the stator chips arranged in the circumferential direction may constitute one circular stator.

The stator 31 is formed of a plurality of silicon steel plates stacked with each other. The tooth 33 includes two surfaces in the circumferential direction (surfaces on a slot side) and two surfaces in the axial direction (in an axial direction of the stator), and has a rectangular shape in a cross section.

The insulation member 34 is formed of an aramid insulation paper or resin such as the PPS resin. The insulation member 34 is formed to have a square cylindrical shape surrounding an entire circumference of the tooth 33 having a rectangular shape in a cross section or is constituted of a pair of two pieces surrounding the entire circumference of the tooth 33, that is, the insulation member 34 has a split shape.

Meanwhile, the convex strips may be formed on a circumferential surface and/or an axial surface of the tooth 33, and the concave grooves may be formed on the inner circumference surface of the insulation member 34, the concave grooves being fitted to the convex strips. In this manner, an area of contact between the tooth 33 and the insulation member 34, and an air space is hard to be formed between the tooth 33 and the insulation member 34. In addition, a position of the fitting of the insulation member 34 is unmoved with respect to the tooth 33.

The winding wire 35 is wound in the concentrated winding. In particular, the insulation members 34 are fitted to the tooth 33, and the winding wire 35 is tightly wound on the outer circumference of the insulation members 34 in the concentrated winding.

The thermal conductor 37 is the resin having a high thermal conductivity. The stator 31 is arranged in a metal mold, the metal mold is filled with the resin (the thermal conductor 37), then the spaces between the winding wires 35 are also filled with the resin, and thereby an outer shape of the thermal conductor 37 is formed to have a rectangular shape in a cross section or other shapes. The mold forming can be carried out not only before but also after the stator 31 is fitted into the external case 40.

In the mold forming, the coolant channel 38 is formed by inserting a resin tube, a metal tube, a rod core formed of thermally-melting material, or the like in the metal mold, the resin tube, the metal tube, and the rod core being formed in a circular shape. In this manner, the coolant channel 38 is formed inside the thermal conductor 37.

FIG. 15 to FIG. 18 illustrate four coolant channels 38. In particular, three of the coolant channels 38 are arranged on a position being overlapped with the winding wire 35 and the tooth 33, and the remaining one of the coolant channels 38 is arranged on a position being overlapped with the yoke 32. The four coolant channels 38 are each looped to have a concentric circular shape, a coolant supply port member 43 in common use is disposed on one ends of the four coolant channels 38, and a coolant discharge port member 44 in common use is disposed on the other ends of the four coolant channels 38.

The coolant supply port member 43 and the coolant discharge port member 44 are connected to a coolant circulating device disposed outside the stator 31. In this manner, a cooling medium such as cooled water and oil is allowed to be supplied to the coolant supply port member 43, to be circulated in the coolant channels 38, and to be discharged from the coolant discharge port member 44.

The four coolant channels 38 may be formed by spirally winding one channel fourfold. In that case, the coolant supply port member 43 is connected to one end portion of the channel, and the coolant discharge port member 44 is connected to the other end portion.

Figure 19:
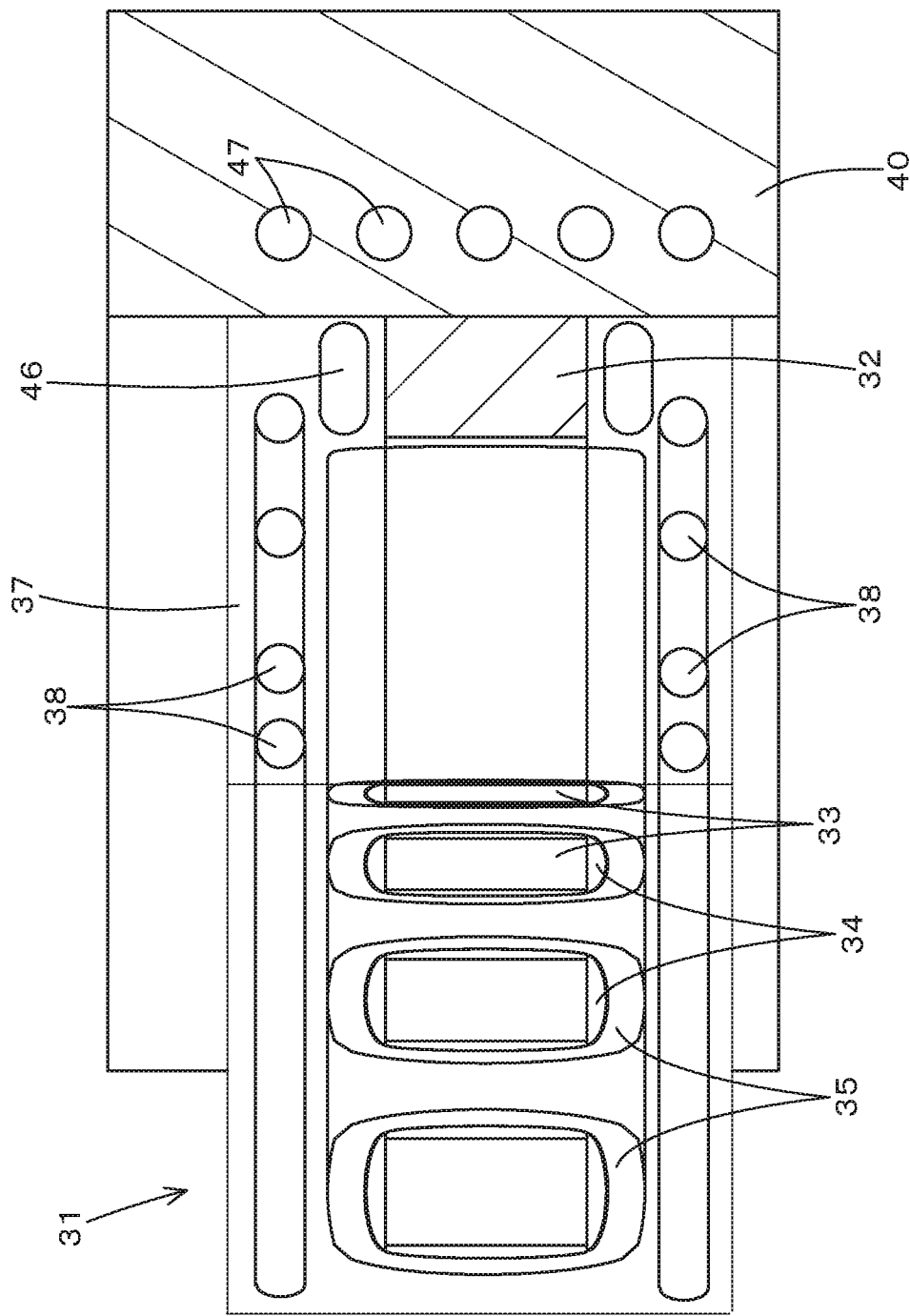
FIG. 19 is a front view illustrating a cooling structure for an electric rotating machine according to a fourth embodiment of the present invention.

FIG. 19 illustrates a cooling structure for an electric rotating machine according to a fourth embodiment. The coolant channels 38 in the thermal conductor 37 are arranged on each of both sides of the stator 31 in the axial direction of the stator 31. Auxiliary channels 46 are formed on both side surfaces of the yoke 32, the auxiliary channels 46 having an oval shape in a cross section. The auxiliary channel 46 is overlapped with an axial side surface of the yoke 32 and with an end portion of the winding wire 35 on an outer side of a diameter of the stator 31, and thereby cooling the winding wire 35 and the yoke 32. A cooling channel 47 is also formed on a side close to the inner circumference in the vicinity of the yoke 32 in the external case 40, the cooling channel 47 supplying the coolant.

In the third embodiment and the fourth embodiment, the coolant channel 38 may be arranged in the thermal conductor 37 in a form of a lattice shape or a zigzag shape extending in the circumferential direction in a view seen in the axial direction. In addition, the coolant channel 38 may enter between the winding wires 35 adjacent to each other in the circumference direction from a side of the winding wire 35. And, the coolant channel 38 may be arranged threading the winding wires 35 adjacent to each other in the circumference direction.

The coolant channel 38 may have a circular shape, an oval shape, a rectangular shape, or other shapes in the cross section. It is required to arrange one or more coolant channels 38 on at least one side surface in the axial direction of the stator 31. The coolant channel 38 can be arranged on a position overlapped with the yoke 32, and however is arranged on at least a position overlapped with the winding wire 35, that is, a position allowing the coil end to be cooled.

In the electric rotating machine incorporating the stator 31, the thermal conductor 37 formed of the resin having a high thermal conductivity fills a space between the winding wires 35, and covers both sides of the winding wires 35, the tooth 33, and the yoke 32 in the axial direction. In this manner, the thermal conductor 37 conducts a resistance heat generated in the winding wire 35 and the tooth 33 and absorbs the resistance heat, and the coolant flowing in the coolant channel 38 removes the resistance heat.

Only the resin having a high thermal conductivity is present between the winding wire 35 and the coolant channel 38 that are heat generators. In this manner, a heat resistance between the winding wire 35 and the coolant channel 38 are reduced. In addition, the thermal conductor 37 itself is cooled by the coolant supplied to the coolant channel 38, and thus the resistance heat is removed to further improve the cooling efficiency. Moreover, the coolant channel 38 is formed integrally in the thermal conductor 37, and thus the number of components can be reduced, thereby simplifying the mold forming.

The coolant channel 38 can be arranged in the vicinity of a coil end of the winding wire 35 disposed inside the thermal conductor 37. The coolant channels 38 are arranged on both sides of the winding wire 35, on both sides of the yoke 32, and the like, and thus the stator 31 can be cooled entirely and uniformly, thereby holding a temperature of the winding wire 35 low. In this manner, a life of the electric rotating machine also can be extended.

When the cooling efficiency by the coolant is improved, structural components such as the fin in the electric rotating machine can be reduced, a power of a forced cooling system can be reduced. In this manner, vibrations and noises of the electric rotating machine and the forced cooling system can be reduced.

In addition, the stator 31 includes the thermal conductor 37 covering an outer surface of the stator 31, and thus the outer circumference surface of the stator 31 can be fixed to the inner circumference surface of the external case 40 even in rough manufacturing accuracy. In this manner, the cost for manufacture also can be reduced. In addition, in the case of a flat and thin electric rotating machine, the cooling area and the cooling capacity larger than an electric rotating motor without the thermal conductor 37 can be obtained.

Meanwhile, the configurations illustrated in FIG. 1 to FIG. 19 are the best regarding the shapes of components and the positional relations in the front and rear, in the right and left, and in the up and down according to the embodiments of the present invention. However, the shapes and the positional relations are not limited to those described in the embodiments, and thus materials and configurations may be modified variously and combinations thereof may be modified.

For example, in the stators for the electric motors according to the first embodiment and the second embodiment, the winding wire 5 may be wound in the distribution winding after the circular arranging of the plurality of split stators 1 and the fitting of the insulation member 4 to all of the yokes 2. In addition, the cross section of the concave-convex portion 3a of the tooth 3 has a square shape, and the cross section of the concave-convex portion 4a of the insulation member 4 also has a square shape; however, the cross section may have a trapezoid shape, a circular arc shape (a wavy shape), a serration shape, and the like.

For example, in the cooling structure for the electric rotating machine according to the first embodiment, the jacket channel 12a may form the communication grooves a2 and a3 on both ends of the water jacket 12, the communication grooves a2 and a3 being formed to have the circular shapes, and then both of the circular communication grooves a2 and a3 communicate with both ends of the plurality of straight holes a1 arranged in the circumferential direction. In addition, while the winding wire 13 is wound in the concentrated winding, the winding wire 13 may be wound over the plurality of teeth 14B in the distributed winding.

For example, in the cooling structures for the electric rotating machines according to the third embodiment and the fourth embodiment, while the winding wire 35 is wound in the concentrated winding, the winding wire 35 may be wound over the plurality of teeth 33 in the distributed winding.

DESCRIPTION OF THE REFERENCE NUMERAL

1 Stator
2 Yoke
3 Tooth
3a Concave-convex portion
4 Insulation member
4a Concave-convex portion
4b Outer surface
4c Attachment portion (Spiral concave-convex portion)
4d Slot insulation portion
5 Winding wire
11 Electric rotating machine
12 Water jacket
12a Jacket channel
12b Inner circumferential surface
13 Winding wire
14 Stator
14A Yoke
14B Tooth
15 Thermal conductor
16 Motor housing
18 Coolant channel
21 Insulation member
22 Seal ring
31 Stator
32 Yoke
33 Tooth
34 Insulation member
35 Winding wire
37 Thermal conductor
38 Coolant channel
A Circumferential surface
B Axial surface
P Split surface
W1, W2 Width

What is claimed is:

1. A stator of an electric motor comprising:
a yoke having a circular shape;
a plurality of teeth arranged in a circumferential direction of an inner circumference of the yoke;
a winding wire wound on a tooth;
an insulation member disposed between the tooth and the winding wire, the insulation member being formed of elastic resin;
a concave-convex portion formed at least on a circumferential surface among the circumferential surface and an axial surface of the tooth, the concave-convex portion including,
a plurality of convex strips formed at intervals in a direction of diameter of the yoke and extended in an axial direction of the yoke,
wherein the insulation member includes:
an outer surface on which the winding wire is wound; and
an inner surface having a concave-convex portion configured to be fitted to the concave-convex portion of the tooth, the inner surface being integrally formed with the outer surface.

2. The stator of the electric motor according to claim 1, wherein
the an outer surface surrounds the tooth, is positioned outside the circumferential surface and the axial surface of the tooth, and is formed to have a circular arc shape intermediately bulging in a winding direction of the winding wire.

3. The stator of the electric motor according to claim 1 or 2, wherein
the winding wire has a circular cross section, and
the outer surface includes
a plurality of attachment portions arranged in a direction of a diameter of the tooth, the attachment portion being fitted to the winding wire.

4. The stator of the electric motor according to claim 1 or 2, wherein
the insulation member is split to have a split shape,
one of the insulation members of the split shape is opposed to the other one of the insulation members, and
both of the insulation members opposed to each other surround the circumferential surface and the axial surface of the tooth.

5. The stator of an electric motor according to claim 1, wherein the concave-convex portion is formed on the axial surface of each of the teeth.

6. A cooling structure of an electric rotating machine comprising:
a water jacket internally including
a jacket channel configured to allow passage of a coolant, the water jacket being formed of material having a high thermal conductivity and disposed in the motor housing;
a stator disposed on an inner circumference of the water jacket, the stator having a circular shape;
a winding wire wound on the stator;
a thermal conductor integrated with an inner circumferential surface of the water jacket, the thermal conductor being formed of resin having a high thermal conductivity and molded to cover the winding wire and the stator in mold forming; and
a motor housing separated from the water jacket,
wherein the thermal conductor has a width defined in an axial direction of the stator, the width being varied wider on an outer side of the thermal conductor than on an inner side of the thermal conductor, and has two side surfaces arranged in the axial direction of the stator and arranged being tapered in the axial direction such that the width defined in the axial direction of the stator is gradually reduced from an outer circumference portion of the thermal conductor contacted to the water jacket toward an inner circumference portion side of the thermal conductor,
the width of the outer side of the thermal conductor substantially corresponds to a full width of the water jacket in an axial direction of the water jacket.

7. The cooling structure for the electric rotating machine according to claim 6, wherein
the water jacket is formed of aluminum alloy,
the motor housing is formed of a casting using iron, and
the thermal conductor is molded on the inner circumferential surface of the water jacket in mold forming before the water jacket is disposed in the motor housing and covers the winding wire and the stator.

8. The cooling structure for the electric rotating machine according to claim 6 or 7, wherein
the water jacket has a cylindrical shape, and
the jacket channel is formed to have a zigzag shape extending in a circumferential direction of the water jacket within a width of water jacket, the width extending between both ends of the water jacket in an axial direction of the water jacket.

9. The cooling structure for the electric rotating machine according to claims 6 or 7, comprising
a coolant channel disposed in the thermal conductor, the coolant channel being overlapped with the stator and the winding wire in the axial direction of the stator.

10. A cooling structure for an electric rotating machine comprising:
a yoke having a circular shape;
a plurality of teeth projecting inward from an inner circumference side of the yoke in the direction of diameter of the yoke and being arranged at intervals in a circumference direction of the yoke;
a winding wire wound on the teeth;
a stator including the yoke, the teeth, and the winding wire;
a thermal conductor formed of resin having a high thermal conductivity;
an insulation member disposed between the tooth and the winding wire, the insulation member being formed of elastic resin; and
a coolant channel disposed in the thermal conductor,
wherein the thermal conductor being molded on both side surfaces of the stator in an axial direction of the stator and filled in a space between the winding wires, and
wherein the winding wire is wound on the insulation member disposed on the tooth in concentrated winding, and
wherein the cooling channel is arranged extending in the circumference direction to be overlapped with the winding wire wound on the plurality of teeth in the axial direction of the stator.

11. The cooling structure of the electric rotating machine according to claim 10, wherein
the cooling channel is formed on at least one of side surfaces included in the stator in an axial direction of the stator and has a circular shape, a spiral shape, a lattice shape, or a zigzag shape extending in a circumferential direction of the thermal conductor in a view seen in an axial direction of the stator.

12. The cooling structure of the electric rotating machine according to claim 10,
wherein the cooling channel is arranged on a position overlapped with the winding wire and the teeth in the axial direction of the stator, and arranged on a position overlapped with the yoke in the axial direction of the stator.

13. The cooling structure of the electric rotating machine according to claim 10,
wherein the cooling channel arranged on a position overlapped with the yoke and the cooling channel arranged on a position overlapped with the winding wire and the teeth are formed each to have a concentric circular shape in the direction of diameter of the yoke.

* * * * *